(12) United States Patent
Lee et al.

(10) Patent No.: US 12,061,031 B2
(45) Date of Patent: Aug. 13, 2024

(54) HEAT MANAGEMENT SYSTEM

(71) Applicant: Hanon Systems, Daejeon (KR)

(72) Inventors: Hae-Jun Lee, Daejeon (KR); Sung Je Lee, Daejeon (KR); In-Guk Hwang, Daejeon (KR)

(73) Assignee: Hanon Systems, Daejeon (KR)

( * ) Notice: Subject to any disclaimer, the term of this patent is extended or adjusted under 35 U.S.C. 154(b) by 461 days.

(21) Appl. No.: 17/267,628

(22) PCT Filed: Jun. 27, 2019

(86) PCT No.: PCT/KR2019/007770
§ 371 (c)(1),
(2) Date: Feb. 10, 2021

(87) PCT Pub. No.: WO2020/040418
PCT Pub. Date: Feb. 27, 2020

(65) Prior Publication Data
US 2022/0349627 A1    Nov. 3, 2022

(30) Foreign Application Priority Data

Aug. 21, 2018    (KR) .......................... 10-2018-0097124

(51) Int. Cl.
*F25B 5/04*     (2006.01)
*B60H 1/00*     (2006.01)
(Continued)

(52) U.S. Cl.
CPC ........... *F25B 5/04* (2013.01); *B60H 1/00278* (2013.01); *B60H 1/00392* (2013.01);
(Continued)

(58) Field of Classification Search
CPC .... F25B 5/04; F25B 5/02; F25B 41/20; F25B 2339/047; F25B 2400/0403;
(Continued)

(56) References Cited

U.S. PATENT DOCUMENTS

2012/0037352 A1    2/2012  Osaka et al.
2016/0076795 A1*   3/2016  Goenka ................... F25B 41/24
                                                                62/160
(Continued)

FOREIGN PATENT DOCUMENTS

JP    2014037178 A    2/2014
KR    101416357 B1    7/2014
(Continued)

OTHER PUBLICATIONS

WO-2020003965-A1 English Translation (Year: 2020).*
(Continued)

*Primary Examiner* — David J Teitelbaum
*Assistant Examiner* — Devon Moore
(74) *Attorney, Agent, or Firm* — Norton Rose Fulbright US LLP; James R. Crawford

(57) ABSTRACT

A heat management system includes a refrigerant circulation line for circulating refrigerant, the refrigerant circulation line comprising a compressor, a water-cooled condenser, a first expansion valve, an air-cooled condenser, a second expansion valve, an evaporator, a refrigerant heat exchanger for causing mutual heat exchange between refrigerant introduced into the second expansion valve and refrigerant discharged from the evaporator, and a first refrigerant bypass line configured such that refrigerant that has passed through the water-cooled condenser bypasses the first expansion valve and the air-cooled condenser; a heating line for heating the indoor space by circulating cooling water that exchanges heat with the refrigerant through the water-cooled condenser; and a cooling line for cooling a battery and electronic equipment components by circulating the cooling water that exchanges heat with the refrigerant or air.

14 Claims, 15 Drawing Sheets

(51) Int. Cl.
  *B60H 1/32* (2006.01)
  *F25B 5/02* (2006.01)
  *F25B 41/20* (2021.01)

(52) U.S. Cl.
  CPC .......... *B60H 1/32284* (2019.05); *F25B 5/02* (2013.01); *F25B 41/20* (2021.01); *B60H 2001/00928* (2013.01); *F25B 2339/047* (2013.01); *F25B 2400/0403* (2013.01)

(58) Field of Classification Search
  CPC ............ B60H 1/32284; B60H 1/00278; B60H 1/00392; B60H 1/00385; B60H 2001/00928; B60H 2001/00935
  See application file for complete search history.

(56) References Cited

U.S. PATENT DOCUMENTS

| | | | |
|---|---|---|---|
| 2016/0107504 A1 | 4/2016 | Johnston | |
| 2016/0107508 A1* | 4/2016 | Johnston | B60H 1/00278 237/12.3 A |
| 2018/0050605 A1* | 2/2018 | Lewis | B60L 58/25 |
| 2018/0117986 A1* | 5/2018 | Kim | B60H 1/00278 |
| 2019/0381857 A1* | 12/2019 | Lee | B60H 1/00278 |
| 2020/0031194 A1* | 1/2020 | Lee | B60H 1/00278 |

FOREIGN PATENT DOCUMENTS

| | | | | |
|---|---|---|---|---|
| KR | 20150041739 A | | 4/2015 | |
| KR | 10-2015-0088953 A | | 8/2015 | |
| KR | 10-2016-0046262 A | | 4/2016 | |
| KR | 10-2018-0007021 A | | 1/2018 | |
| KR | 10-2018-0091978 A | | 8/2018 | |
| KR | 20180091978 A | * | 8/2018 | ........... B60H 1/0089 |
| WO | WO-2015136768 A1 | * | 9/2015 | ......... B60H 1/00278 |
| WO | WO-2019111621 A1 | * | 6/2019 | ............... B60H 1/22 |
| WO | WO-2019186077 A1 | * | 10/2019 | ......... B60H 1/00278 |
| WO | WO-2020003965 A1 | * | 1/2020 | ......... B60H 1/00278 |

OTHER PUBLICATIONS

KR-20180091978-A English Translation (Year: 2018).*
WO-2019111621-A1 English Translation (Year: 2019).*
WO-2015136768-A1 English Translation (Year: 2015).*
WO-2019186077-A1 English Translation (Year: 2019).*
Office Action issued on Aug. 24, 2023 by the CIPO in the corresponding Patent Application No. 201980054269.9, with English translation.

* cited by examiner

HEAT MANAGEMENT SYSTEM

This application is a national phase under 35 U.S.C. § 371 of International Application No. PCT/KR2019/007770 filed Jun. 27, 2019, which claims the benefit of priority to Korean Patent Application No. 10-2018-0097124 filed Aug. 21, 2018. The entire contents of these applications are incorporated herein by reference in their entirety.

TECHNICAL FIELD

The present invention relates to a heat management system, and more particularly, to a system for managing heat of electric components and a battery in a vehicle as well as cooling and heating of the vehicle.

BACKGROUND ART

In recent years, electric vehicles are being spotlighted as solutions to problems such as the implementation of environmentally friendly technologies and energy depletion in an automotive field.

The electric vehicles run using a motor that is driven by receiving power from a battery or a fuel cell, and therefore, carbon emissions are low and noise is low. In addition, the electric vehicles are eco-friendly because motors that have higher energy efficiency than conventional engines are used.

However, heat management is important because the electric vehicles generate a lot of heat during operation of the battery and the driving motor. In addition, since it takes a long time to recharge the battery, it is important to manage the use time of the battery efficiently. In particular, in the electric vehicles, since a refrigerant compressor that is driven for indoor air conditioning is also driven by electricity, it is more important to manage the use time of the battery. In addition, since the driving motor and inverter generate relatively more heat than other electrical components such as the battery and charger, the driving motor needs to be cooled to an appropriate temperature, and to this end, there is a need to increase a cooling performance of a heat exchanger for cooling the driving motor.

RELATED ART DOCUMENT

Patent Document

KR 2018-0007021 A (2018.01.22)

DISCLOSURE

Technical Problem

An object of the present invention is to provide a heat management system that may manage heat of electrical components and a battery in a vehicle as well as cooling and heating of the vehicle.

In addition, an object of the present invention is to provide a heat management system that may increase a use time of a battery by reducing power consumption.

Technical Solution

In one general aspect, a heat management system includes: a refrigerant circulation line 200 that includes a compressor 210, a water-cooled condenser 220, a first expansion valve 225, an air-cooled condenser 230, a second expansion valve 240, an evaporator 242, a refrigerant heat exchanger 233 for mutually exchanging heat between refrigerant flowing into the second expansion valve 240 and refrigerant discharged from the evaporator 242, and a first refrigerant bypass line 232 for allowing the refrigerant passing through the water-cooled condenser 220 to bypass the first expansion valve 225 and the air-cooled condenser 230, and circulates the refrigerant to cool the indoor; a heating line 301 that heats the indoor by circulating cooling water heat-exchanged with the refrigerant through the water-cooled condenser 220; and a cooling line 302 that cools a battery 350 and an electrical component 460 by circulating air or the cooling water heat-exchanged with the refrigerant.

The first refrigerant bypass line 232 may not be used in a cooling mode, and may flow the refrigerant in a heating mode.

The first refrigerant bypass line 232 may not be used in a cooling mode, and may flow the refrigerant in a dehumidification heating mode.

The refrigerant heat exchanger 233 may exchange heat between refrigerant flowing into the second expansion valve 240 and refrigerant discharged from the evaporator 242 in a cooling mode, and may not exchange heat between the refrigerant flowing into the second expansion valve 240 and the refrigerant discharged from the evaporator 242 in a heating mode.

The refrigerant circulation line 200 may further include a check valve 231 installed between a rear side of the air-cooled condenser 230 and a rear end of the first refrigerant bypass line 232 in a flow direction of the refrigerant.

The cooling line 302 may include a first connection line 302-1 branched from one side of the cooling line 302 and connected to the heating line 301; and a second connection line 302-2 branched from the other side of the cooling line 302 and connected to the heating line 301.

The first connection line 302-1, the second connection line 302-2, and the heating line 301 may be connected to a first direction switching valve 410, and the cooling line 302 and the heating line 301 may be connected to each other or may be disconnected by the first direction switching valve 410.

The electrical component 460 may be disposed on the second connection line 302-2.

The cooling line 302 may further include a fourth connection line 302-4 connecting the first connection line 302-1 and the second connection line 302-2, and a shut-off valve 360 installed on the fourth connection line 302-4 and disposed in parallel with the first direction switching valve 410.

The cooling line 302 may further include a cooling water temperature sensor 461 installed in front of the electrical component 460 in a flow direction of the cooling water.

The refrigerant circulation line 200 may further include a third expansion valve 251 for throttling, bypassing or blocking a flow of the refrigerant discharged from the water-cooled condenser 220, and a chiller 252 that exchanges heat between the refrigerant discharged from the third expansion valve 251 and the cooling water of the cooling line 302.

The refrigerant heat exchanger 233 may be connected in parallel with the air-cooled condenser 230 and the chiller 252.

The cooling line 302 may include a third connection line 302-3 connected in parallel with the battery 350 and passing through the chiller 252, and the third connection line 302-3 is connected to the cooling line 302 by a third direction switching valve 330, such that the cooling water may flow or may be blocked from flowing to the third connection line 302-3 by the third direction switching valve 330.

The cooling line 302 may include an electrical radiator 310 for cooling the cooling water with air.

The heating line 301 may include a heater core 440 that heats the indoor using heated air by exchanging heat between cooling water heat-exchanged with the refrigerant through the water-cooled condenser 220 and air flowing into the indoor, and a cooling water heater 430 disposed in front of the heater core 440 in the flow direction of the cooling water to heat the cooling water.

The heating line 301 may include a heater core 440 that heats the indoor using heated air by exchanging heat between cooling water heat-exchanged with the refrigerant through the water-cooled condenser 220 and air flowing into the indoor, and may further include an air heating type heater 470 configured separately from the heating line 301 and directly heats the air flowing into the indoor to heat the indoor.

The second expansion valve 240 may be disposed between the refrigerant heat exchanger 233 and the evaporator 242, the second expansion valve 240 may be a mechanical expansion valve 240b in which a flow rate for throttling the refrigerant is mechanically adjusted according to a temperature of the flowing refrigerant, and the refrigerant circulation line 200 may further include a second refrigerant bypass line 234 connected in parallel with the mechanical expansion valve 240b; and a three-direction switching valve 240-1 installed at a point where the refrigerant is branched to the mechanical expansion valve 240b side and the second refrigerant bypass line 234.

The second expansion valve 240 may be disposed between the refrigerant heat exchanger 233 and the evaporator 242, the second expansion valve 240 may be a mechanical expansion valve 240b in which a flow rate for throttling the refrigerant is mechanically adjusted according to a temperature of the flowing refrigerant, and the refrigerant circulation line 200 may further include a second refrigerant bypass line 234 connected in parallel with the mechanical expansion valve 240b; a first opening/closing valve 240-2 installed on the second refrigerant bypass line 234 after the refrigerant is branched; and a second opening/closing valve 240-3 installed on the mechanical expansion valve 240b side after the refrigerant is branched.

The second expansion valve 240 may be disposed between the refrigerant heat exchanger 233 and the evaporator 242, the second expansion valve 240 may be a mechanical expansion valve integrated with an electronic opening/closing valve 240c in which a flow rate for throttling the refrigerant is mechanically adjusted according to a temperature of the flowing refrigerant, and the electronic opening/closing valve is integrally formed, and the refrigerant circulation line 200 may further include a second refrigerant bypass line 234 connected in parallel with the mechanical expansion valve integrated with an electronic opening/closing valve 240c; and a first opening/closing valve 240-2 installed on the second refrigerant bypass line 234 after the refrigerant is branched.

Advantageous Effects

The heat management system according to the present invention may manage the heat of the electrical components and the battery in the vehicle as well as the cooling and heating of the vehicle.

In addition, the heat management system according to the present invention may improve the cooling and heating performance, and increase the use time of the battery by reducing the power consumption.

BEST MODE

Hereinafter, a heat management system according to the present invention having the configuration as described above will be described in detail with reference to the accompanying drawings.

Figure 1:
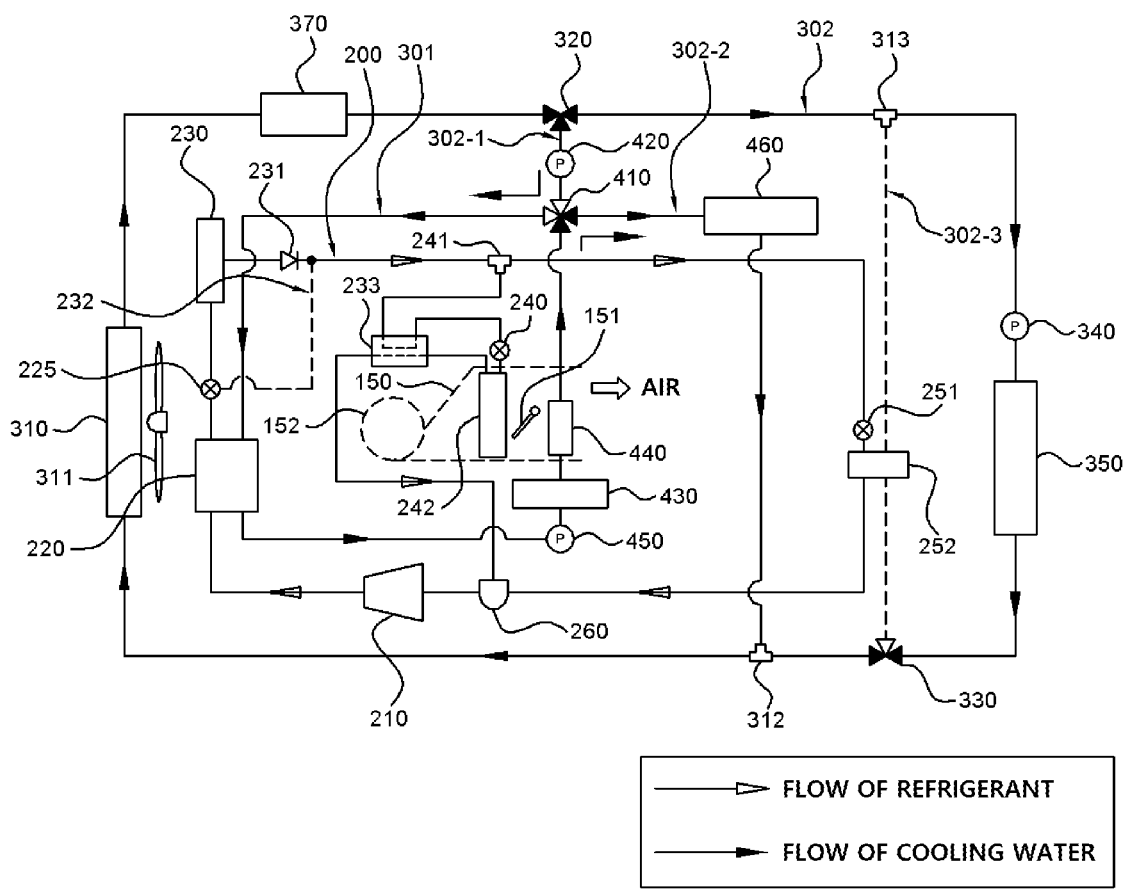
FIG. 1 is a configuration diagram illustrating a heat management system according to an embodiment of the present invention.

FIG. 1 is a configuration diagram illustrating a heat management system according to an embodiment of the present invention.

Referring to FIG. 1, a heat management system according to the present invention may generally include a refrigerant circulation line 200 through which refrigerant is circulated to cool an indoor, and a cooling water circulation line 300 through which cooling water is circulated to heat the indoor and cool parts. In addition, the cooling water circulation line 300 may include a heating line 301 for indoor heating and a cooling line 302 for cooling an electrical component 460 and a battery 350.

The refrigerant circulation line 200 may include a compressor 210, a water-cooled condenser 220, a first expansion valve 225, an air-cooled condenser 230, a check valve 231, a first refrigerant bypass line 232, a refrigerant branch portion 241, a second expansion valve 240, an evaporator 242, a refrigerant heat exchanger 233, an accumulator 260, a third expansion valve 251, and a chiller 252.

The compressor 210 may be an electrical compressor driven by being supplied with power, and serves to suck and compress refrigerant and discharge the refrigerant toward the water-cooled condenser 220.

The water-cooled condenser 220 serves to perform heat exchange of the refrigerant discharged from the compressor 210 with cooling water to condense the refrigerant into liquid refrigerant, and transfer the liquid refrigerant toward the first expansion valve 225.

The first expansion valve 225 may serve to throttle or bypass the refrigerant or block a flow of the refrigerant, and may be disposed behind the water-cooled condenser 220 in a flow direction of the refrigerant.

The air-cooled condenser 230 serves as a condenser or an evaporator, and a function of the air-cooled condenser 230 may be varied according to the role of the first expansion valve 225. That is, when the refrigerant circulation line 200 is used as an air conditioner loop, the first expansion valve 225 is fully opened to pass the refrigerant and the air-cooled condenser 230 serves as a condenser together with the water-cooled condenser 220, and when the refrigerant circulation line 200 is used as a heat pump loop, the first expansion valve 225 throttles the refrigerant and the air-cooled condenser 230 serves as an evaporator. In addition, the air-cooled condenser 230 may be cooled or heated in an air-cooled manner by external air.

The check valve 231 serves to prevent the refrigerant from flowing backward, and may be installed at the rear of the air-cooled condenser 230 in the flow direction of the refrigerant to prevent the refrigerant from flowing into a discharge side of the air-cooled condenser 230.

The first refrigerant bypass line 232 is connected in parallel with the air-cooled condenser 230, and the first refrigerant bypass line 232 has one end connected to the first expansion valve 225 and the other end connected to the rear of the check valve 231 in the flow direction of the refrigerant, so that the refrigerant discharged from the water-cooled condenser 220 may selectively pass through the air-cooled condenser 230 or the first refrigerant bypass line 232. That is, the first refrigerant bypass line 232 may allow the refrigerant that has passed through the water-cooled condenser 220 to bypass the first expansion valve 225 and the air-cooled condenser 230. Here, the refrigerant may flow only toward the air-cooled condenser 230 by the operation of the first expansion valve 225 and the refrigerant may not flow to the first refrigerant bypass line 232. At this time, the refrigerant flowing toward the air-cooled condenser 230 may be throttled by the first expansion valve 225 or may pass through the first expansion valve 225 without being throttled. Alternatively, the refrigerant does not flow toward the air-cooled condenser 230 by the operation of the first expansion valve 225, and the refrigerant may flow only to the first refrigerant bypass line 232, and at this time, as the refrigerant flowing toward the first refrigerant bypass line 232, the refrigerant bypassed by the first expansion valve 225 may flow.

The refrigerant branch portion 241 may be formed at a rear side of a point where a rear side of the air-cooled condenser 230 and the first refrigerant bypass line 232 meet in the flow direction of the refrigerant, and the refrigerant branch portion 241 may be branched into two lines so that one line is connected to the evaporator 242 and the other line is connected to the chiller 252.

The second expansion valve 240 and the third expansion valve 251 may serve to throttle or pass the refrigerant, or block the flow of the refrigerant. In addition, the second expansion valve 240 and the third expansion valve 251 may be configured in parallel. That is, a refrigerant line may be branched into two lines from the refrigerant branch portion 241, the second expansion valve 240 may be disposed on one of the two branched refrigerant lines, and the third expansion valve 251 may be disposed on the other refrigerant line. At this time, the second expansion valve 240 may be disposed in front of the evaporator 242, and the third expansion valve 251 may be disposed in front of the chiller 252.

The evaporator 242 is disposed at the rear of the second expansion valve 240 in the flow direction of the refrigerant and is provided inside an air conditioner 150 of a vehicle, such that air flowing by a blower 152 of the air conditioner is cooled through the evaporator 242 and supplied to the indoor of the vehicle to be used for cooling the indoor of the vehicle.

The refrigerant heat exchanger 233 serves to improve cooling performance by performing heat-exchange between the refrigerant flowing into the second expansion valve 240 and the refrigerant discharged from the evaporator 242. Here, an inlet side refrigerant line through which the refrigerant flows into the evaporator 242 connecting the refrigerant branch portion 241 and the second expansion valve 240 passes through the refrigerant heat exchanger 233, a discharge side refrigerant line through which the refrigerant is discharged from the evaporator 242 connecting the evaporator 242 and the accumulator 260 passes through the refrigerant heat exchanger 233, and heat exchange may occur between the refrigerants passing through the inlet side refrigerant line and the discharge side refrigerant line. Thus, the refrigerant may be further cooled before flowing into the second expansion valve 240 by the refrigerant heat exchanger 233, the cooling performance through the evaporator 242 may be improved, and the efficiency of the cooling system may be improved.

In particular, the refrigerant heat exchanger 233 is connected in parallel with the air-cooled condenser 230 and the chiller 252. That is, the refrigerant heat exchanger 233 is not disposed in series with the refrigerant line between the air-cooled condenser 230 and the chiller 252, but is disposed adjacent to the evaporator 242. If the refrigerant heat exchanger 233 is disposed in series between the air-cooled condenser 230 and the chiller 252, heating performance may be reduced by acting as a pressure drop on a low pressure side in the heating mode. Conversely, if the refrigerant heat exchanger 233 is connected in parallel, the heating performance as well as the cooling performance is increased, and this is because there is no refrigerant heat exchanger 233 between the condensers 220 and 230 and the chiller 252 in the refrigerant flow in the heating mode.

The chiller 252 may be disposed at the rear of the third expansion valve 251 in the flow direction of the refrigerant, and may perform heat exchange with the cooling water to cool the cooling water. As a result, the second expansion valve 240 and the evaporator 242 form a set, the third expansion valve 251 and the chiller 252 form another set, and the two sets are configured in parallel on the refrigerant line. In addition, the refrigerant line may be joined at the rear side of the evaporator 242 and the chiller 252 in the flow direction of the refrigerant to form a single refrigerant line.

In addition, the accumulator 260 may separate a liquid refrigerant and a gaseous refrigerant among refrigerants and supply only the gaseous refrigerant to the compressor 210.

Here, the accumulator 260 may be disposed at and connected to a point where the rear side of the evaporator 242 and the rear side refrigerant line of the chiller 252 are joined, and the accumulator 260 may be disposed at the front of the compressor 210 in the flow direction of the refrigerant.

The heating line 301 may include a water-cooled condenser 220, a first cooling water pump 450, a cooling water heater 430, a heater core 440, and a first direction switching valve 410.

The water-cooled condenser 220 may exchange heat with each other while passing the refrigerant and cooling water as described above.

The first cooling water pump 450 is a means for pumping the cooling water so that the cooling water is circulated along the heating line 301, and may be disposed at the rear of the water-cooled condenser 220 in the flow direction of the cooling water and installed on the cooling water line.

The cooling water heater 430 is an apparatus for heating the cooling water, and may be disposed at and connected to the rear of the first cooling water pump 450 and the front of the heater core 440 in the flow direction of the cooling water. In addition, the cooling water heater 430 may be operated when a temperature of the cooling water is a specific temperature or less, and may be formed in various ways, such as an induction heater, a seed heater, a PTC heater, a film heater, and the like that may generate heat using power.

The heater core 440 may be disposed in the air conditioner 150 of the vehicle, and the air flowing by the blower 152 may be heated through the heater core 440 and supplied to the indoor of the vehicle to be used for heating the indoor of the vehicle. In addition, the heater core 440 may be disposed at and connected to the rear of the cooling water heater 430 in the flow direction of the cooling water.

The first direction switching valve 410 may be installed between the heater core 440 and the water-cooled condenser 220, and may be configured to selectively connect or disconnect the heating line 301 and the cooling line 302 to be described later. In more detail, the first direction switching valve 410 is installed on the heating line 301 so that two cooling water line pipes may be connected to the first direction switching valve 410, one first connection line 302-1 branched from one side of the cooling line 302 may be connected to the first direction switching valve 410, and one second connection line 302-2 branched from the other side of the cooling line 302 may be connected to the first direction switching valve 410. That is, four cooling water lines are connected to the first direction switching valve 410 so as to meet at the first direction switching valve 410, and the first direction switching valve 410 may be a four-way direction switching valve capable of adjusting a state in which the four cooling water lines are connected to each other or blocked.

The cooling line 302 may include an electrical radiator 310, a reservoir tank 370, a second direction switching valve 320, a second cooling water pump 420, the first direction switching valve 410, an electrical component 460, a first cooling water joint 313, a second cooling water joint 312, a third cooling water pump 340, a battery 350, the chiller 252, and a third direction switching valve 330.

The electrical radiator 310 is a radiator that cools the cooling water heat exchanged with the electrical component 460 or the battery 350, and may be cooled in an air-cooled manner by a cooling fan 311.

The reservoir tank 370 may serve to store the cooling water and supplement insufficient cooling water on the cooling water line, and may be installed on a cooling water line in front of the second cooling water pump 420 and the third cooling water pump 340 in the flow direction of the cooling water.

The second direction switching valve 320 is installed on the cooling line 302 so that two cooling water pipes are connected to the second direction switching valve 320, and the first direction switching valve 410 and the second direction switching valve 320 may be connected to the first connection line 302-1 so that the heating line 301 and the cooling line 302 are connected. That is, three cooling water lines are connected to the second direction switching valve 320 so as to meet at the second direction switching valve 320, and the second direction switching valve 320 may be a three-way direction switching valve capable of adjusting a state in which the three cooling water lines are connected to each other or blocked.

The second cooling water pump 420 is a means for pumping the cooling water so that the cooling water is circulated along the cooling line 302. In addition, the second cooling water pump 420 is installed on the first connection line 302-1 between the first direction switching valve 410 and the second direction switching valve 320 such that the cooling water may flow from the second direction switching valve 320 toward the first direction switching valve 410 by an operation of the second cooling water pump 420.

The first direction switching valve 410 is the same as described in the heating line 301.

The electrical component 460 is disposed on a second connection line 302-2 connecting the first direction switching valve 410 and the second cooling water joint 312, and the electrical component 460 may be cooled by the cooling water. In addition, the electrical component 460 may be a driving motor, an inverter, an On Board Charger (OBC), or the like.

The third cooling water pump 340 is a means for pumping the cooling water so that the cooling water is circulated along the cooling line 302. In addition, the third cooling water pump 340 is installed on the cooling water line between the first cooling water joint 313 and the battery 350, so that cooling water may flow from the third cooling water pump 340 to the battery 350.

The battery 350 is a power source of the vehicle and may be a driving source of various electrical components 460 in the vehicle. Alternatively, the battery 350 may serve to store electricity by being connected to the fuel cell, or to store electricity supplied from the outside. In addition, the battery 350 may be disposed on a cooling water line between the third cooling water pump 340 and the third direction switching valve 330. Thus, the battery 350 may be cooled or heated by heat exchange with the flowing cooling water.

The first cooling water joint 313 is installed on a cooling water line at the rear of the second direction switching valve 320 in the flow direction of the cooling water, and the first cooling water joint 313 is connected so that three cooling water lines meet. That is, the first cooling water joint 313 is installed so that both sides thereof are connected on the cooling line 302, and the third connection line 302-3 may be connected to a lower side thereof. Here, the third connection line 302-3 may be connected to pass through the chiller 252.

The second cooling water joint 312 may be installed at a point where a rear end of the second connection line 302-2 meets the cooling line 302, and is connected so that three cooling water lines meet at the second cooling water joint 312. That is, the second cooling water joint 312 is installed so that both sides thereof are connected on the cooling line 302, and the second connection line 302-2 may be connected to an upper side thereof.

The chiller 252 is the same as described in the heating line 301.

The third direction switching valve 330 is installed on the cooling water line between the battery 350 and the second cooling water joint 312, and two cooling water pipes are connected to the third direction switching valve 330, and a third connection line 302-3 is connected to an upper side of the third direction switching valve 330, such that the battery 350 and the third connection line 302-3 may be connected in parallel. At this time, the second direction switching valve 320 may be a three-way direction switching valve capable of adjusting a state in which the three cooling water lines are connected to each other or blocked.

In addition, the air conditioner 150 may have a blower 152 installed on one side thereof to blow air, and a temperature control door 151 may be installed inside the air conditioner 150. In addition, the evaporator 242 and the heater core 440 disposed in the air conditioner may be disposed and configured so that the air discharged from the blower 152 according to the operation of the temperature control door 151 may pass through only the evaporator 242 and then be introduced into the indoor, or may pass through the evaporator 242 and then pass through the heater core 440 to be introduced into the indoor.

Hereinafter, an operation according to the operation mode of the heat management system according to an embodiment of the present invention described above will be described.

1. Maximum Cooling Mode

Figure 2:
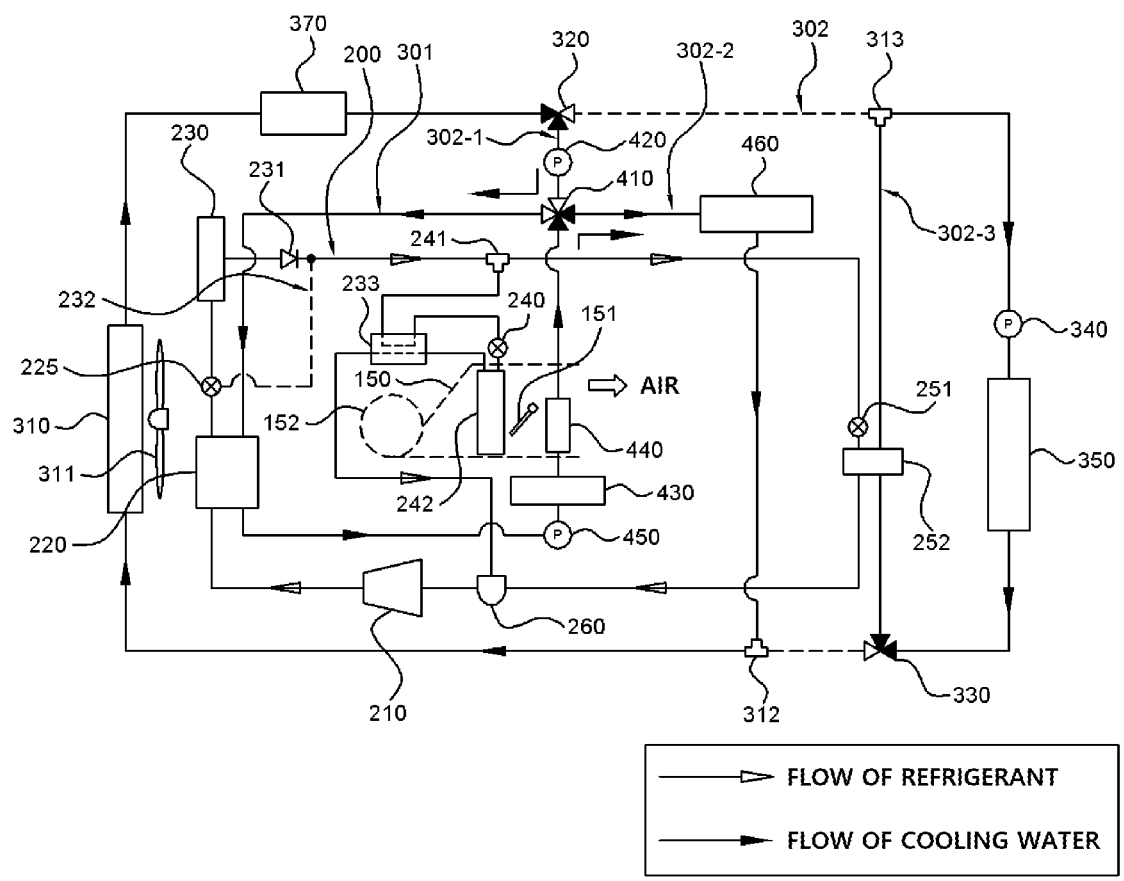
FIG. 2 is a configuration diagram illustrating an operating state in a maximum cooling mode of the heat management system according to an embodiment of the present invention.

FIG. 2 is a configuration diagram illustrating an operating state in a maximum cooling mode of the heat management system according to an embodiment of the present invention.

Referring to FIG. 2, the compressor 210 operates on the refrigerant circulation line 200, and a high temperature and high pressure refrigerant is discharged from the compressor 210. In addition, the refrigerant discharged from the compressor 210 is cooled by being heat-exchanged with cooling water in the water-cooled condenser 220. Subsequently, the refrigerant cooled in the water-cooled condenser 220 passes through the first expansion valve 225 in a completely opened state toward the air-cooled condenser 230 and flows into the air-cooled condenser 230, and is cooled by being heat-exchanged with external air in the air-cooled condenser 230. That is, the water-cooled condenser 220 and the air-cooled condenser 230 both serve as condensers to condense the refrigerant. The condensed refrigerant is then branched from the refrigerant branch portion 241 so that a part of the refrigerant passes through the refrigerant heat exchanger 233 and then passes through the second expansion valve 240 and is throttled to expand the refrigerant, and thereafter, the expanded refrigerant passes through the evaporator 242 and exchanges heat with the air blown by the blower 152 of the air conditioner 150 to evaporate the refrigerant to cool the air, such that the cooled air is supplied to the indoor of the vehicle to achieve the cooling of the indoor. In addition, the refrigerant evaporated in the evaporator 242 passes through the refrigerant heat exchanger 233 and exchanges heat with the refrigerant before flowing into the second expansion valve 240 and then flows into the compressor 210 again through the accumulator 260. In addition, the rest of the refrigerant branched from the refrigerant branch portion 241 is throttled while passing through the third expansion valve 251 to expand the refrigerant, and thereafter, the expanded refrigerant passes through the chiller 252 and exchanges heat with the cooling water so that the refrigerant may be evaporated to cool the cooling water. In addition, the refrigerant evaporated in the chiller 252 passes through the accumulator 260 and flows into the compressor 210 again. At this time, the refrigerant may not flow through the first refrigerant bypass line 232 by the first expansion valve 225. In this way, the refrigerant that has passed through the evaporator 242 and the refrigerant that has passed through the chiller 252 are joined at the accumulator 260 and introduced into the compressor 210, and the refrigerant is circulated while repeating the above-described process.

Meanwhile, the cooling water of the cooling water circulation line 300 is circulated by the operation of the first cooling water pump 450, the second cooling water pump 420, and the third cooling water pump 340. In addition, the refrigerant passing through the water-cooled condenser 220, the electrical component 460, and the battery 350 may be cooled by the cooling water, and the heated cooling water may be cooled by being heat-exchanged with external air by the operation of the cooling fan 311 in the electrical radiator 310. At this time, the first direction switching valve 410 and the second direction switching valve 320 may be adjusted in a direction connecting the heating line 301 and the cooling line 302. In more detail, in the first direction switching valve 410, an upper side and a left side may be connected to each other so that the cooling water flows, and a lower side and a right side may be connected to each other so that the cooling water flows. In addition, in the second direction switching valve 320, a left side and a lower side may be connected to each other so that the cooling water flows, and a connection to a right side may be blocked. In addition, in the third direction switching valve 330, an upper side and a right side may be connected to each other and a left side may be blocked.

As a result, a cycle in which the cooling water is circulated by passing through the reservoir tank 370, the second direction switching valve 320, the second cooling water pump 420, the first direction switching valve 410, the water-cooled condenser 220, the first cooling water pump 450, the cooling water heater 430, the heater core 440, the first direction switching valve 410, the electrical component 460, and the second cooling water joint 312 in sequence from the electrical radiator 310, and then flowing into the electrical radiator 310 again is repeated. Here, the cooling water may not flow from the second direction switching valve 320 to the first cooling water joint 313 by the second direction switching valve 320, and the cooling water may not flow from the third direction switching valve 330 to the second cooling water joint 312 by the third direction switching valve 330. In addition, a cycle in which the cooling water is circulated by passing through the first cooling water joint 313, the third cooling water pump 340, the battery 350, and the third direction switching valve 330 in sequence from the chiller 252 and flowing into the chiller 252 again is repeated. That is, the battery 350 and the chiller 252 form a cooling line with a separate closed loop through which the cooling water is circulated by the second direction switching valve 320 and the third direction switching valve 330 so that the battery 350 may be separately cooled.

Here, the maximum cooling mode may be operated when the temperature of the external air is in the range of 30 to 45 degrees Celsius, and at this time, the compressor 210 may be rotated at a maximum rotational speed. In addition, when the cooling of the battery 350 is not necessary, the third expansion valve 251 is blocked so that the refrigerant may not flow toward the chiller 252, and at this time, the third cooling water pump 340 may not be operated.

2. Mild Cooling Mode

Figure 3:
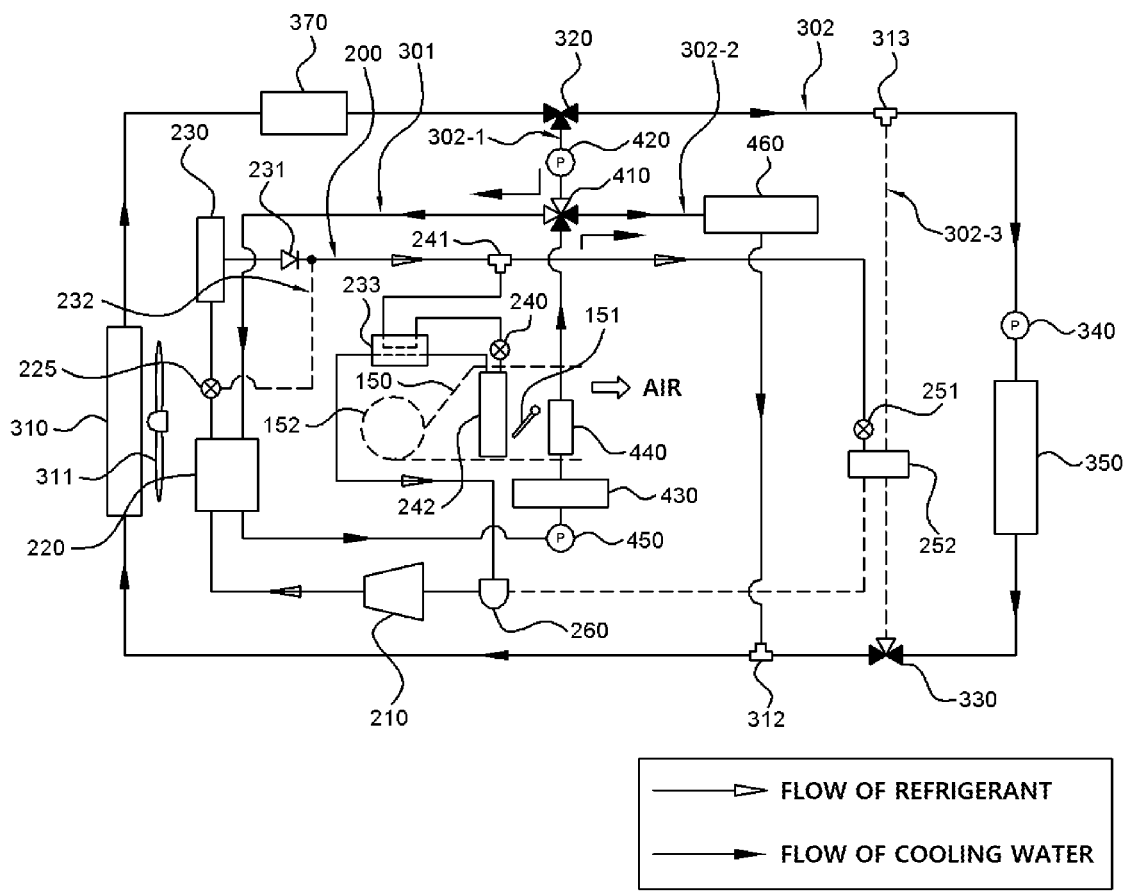
FIG. 3 is a configuration diagram illustrating an operating state in a mild cooling mode of the heat management system according to an embodiment of the present invention.

FIG. 3 is a configuration diagram illustrating an operating state in a mild cooling mode of the heat management system according to an embodiment of the present invention.

Referring to FIG. 3, the compressor 210 operates on the refrigerant circulation line 200, and a high temperature and high pressure refrigerant is discharged from the compressor 210. In addition, the refrigerant discharged from the compressor 210 is cooled by being heat-exchanged with cooling water in the water-cooled condenser 220. Subsequently, the refrigerant cooled in the water-cooled condenser 220 passes through the first expansion valve 225 in a completely opened state toward the air-cooled condenser 230 and flows into the air-cooled condenser 230, and is cooled by being heat-exchanged with external air in the air-cooled condenser 230. That is, the water-cooled condenser 220 and the air-cooled condenser 230 both serve as condensers to condense the refrigerant. The condensed refrigerant then passes through the refrigerant branch portion 241, passes through the refrigerant heat exchanger 233, and then is throttled while passing through the second expansion valve 240 to expand the refrigerant, and thereafter, the expanded refrigerant passes through the evaporator 242 and exchanges heat with the air blown by the blower 152 of the air conditioner 150 to evaporate the refrigerant to cool the air, such that the cooled air is supplied to the indoor of the vehicle to achieve the cooling of the indoor. In addition, the refrigerant evaporated in the evaporator 242 passes through the refrigerant heat exchanger 233 and exchanges heat with the refrigerant before flowing into the second expansion valve 240 and then flows into the compressor 210 again through the accumulator 260. At this time, the refrigerant may not flow through the first refrigerant bypass line 232 by the first expansion valve 225, and the third expansion valve 251 is blocked so that the refrigerant may not flow to the chiller 252.

Thus, after the refrigerant that passed through the evaporator 242 passes through the accumulator 260 and is introduced into the compressor 210, and the refrigerant is circulated while repeating the above-described process.

Meanwhile, the cooling water of the cooling water circulation line 300 is circulated by the operation of the first cooling water pump 450, the second cooling water pump 420, and the third cooling water pump 340. In addition, the refrigerant passing through the water-cooled condenser 220, the electrical component 460, and the battery 350 may be cooled by the cooling water, and the heated cooling water may be cooled by being heat-exchanged with external air by the operation of the cooling fan 311 in the electrical radiator 310. At this time, the first direction switching valve 410 and the second direction switching valve 320 may be adjusted in a direction connecting the heating line 301 and the cooling line 302. In more detail, in the first direction switching valve 410, an upper side and a left side may be connected to each other so that the cooling water flows, and a lower side and a right side may be connected to each other so that the cooling water flows. In addition, in the second direction switching valve 320, the left, lower and right sides of the three directions are all connected so that the cooling water may flow. In addition, in the third direction switching valve 330, the left side and the right side may be connected to each other and an upper side may be blocked.

As a result, a cycle in which the cooling water is circulated by being passed through the reservoir tank 370, the second direction switching valve 320, the second cooling water pump 420, the first direction switching valve 410, the water-cooled condenser 220, the first cooling water pump 450, the cooling water heater 430, the heater core 440, the first direction switching valve 410, the electrical component 460, and the second cooling water joint 312 in sequence from the electrical radiator 310, and then flowing into the electrical radiator 310 again is repeated. In addition, a cycle in which a part of the cooling water is circulated by flowing to the right side by the second direction switching valve 320, passing through the first cooling water joint 313, the third cooling water pump 340, the battery 350, the third direction switching valve 330, and the second cooling water joint 312 in sequence, and flowing into the electrical radiator 310 again is repeated. At this time, the cooling water that has passed through the electrical component 460 and the cooling water that has passed through the battery 350 may be joined at the second cooling water joint 312 and flow into the electrical radiator 310.

Here, the mild cooling mode may be operated when the temperature of the external air is in the range of 15 to 25 degrees Celsius, and at this time, since the battery may be cooled by the electrical radiator, the refrigerant may be prevented from circulating through the chiller, and thus the power consumed for driving the compressor may be reduced.

3. Battery-Dedicated Cooling Mode

Figure 4:
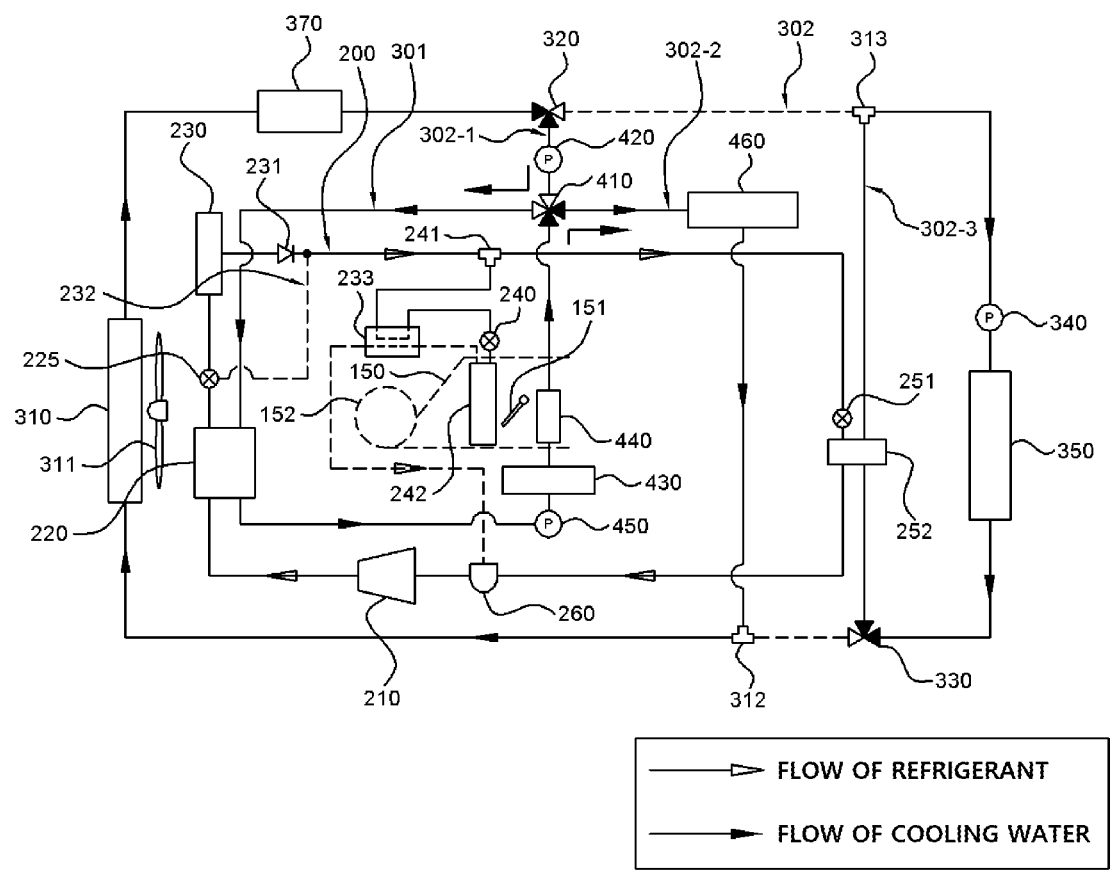
FIG. 4 is a configuration diagram illustrating an operating state in a battery-dedicated cooling mode of the heat management system according to an embodiment of the present invention.

FIG. 4 is a configuration diagram illustrating an operating state in a battery-dedicated cooling mode of the heat management system according to an embodiment of the present invention.

Referring to FIG. 4, the compressor 210 operates on the refrigerant circulation line 200, and a high temperature and high pressure refrigerant is discharged from the compressor 210. In addition, the refrigerant discharged from the compressor 210 is cooled by being heat-exchanged with cooling water in the water-cooled condenser 220. Subsequently, the refrigerant cooled in the water-cooled condenser 220 passes through the first expansion valve 225 in a completely opened state toward the air-cooled condenser 230 and flows into the air-cooled condenser 230, and is cooled by being heat-exchanged with external air in the air-cooled condenser 230. That is, the water-cooled condenser 220 and the air-cooled condenser 230 both serve as condensers to condense the refrigerant. The condensed refrigerant then passes through the refrigerant branch portion 241, passes through the refrigerant heat exchanger 233, and then is throttled while passing through the third expansion valve 251 to expand the refrigerant, and thereafter, the expanded refrigerant exchanges heat with the cooling water while passing through the chiller 252 to cool the cooling water while evaporating the refrigerant, and the cooling of the battery 350 is achieved using the cooled cooling water. In addition, the refrigerant evaporated through the chiller 252 passes through the accumulator 260 and flows into the compressor 210 again. At this time, the refrigerant may not flow through the first refrigerant bypass line 232 by the first expansion valve 225, and the second expansion valve 240 is blocked so that the refrigerant may not flow to the evaporator 242. Thus, the refrigerant is circulated while repeating the above-described process.

Meanwhile, the cooling water of the cooling water circulation line 300 is circulated by the operation of the first cooling water pump 450, the second cooling water pump 420, and the third cooling water pump 340. In addition, the refrigerant passing through the water-cooled condenser 220, the electrical component 460, and the battery 350 may be cooled by the cooling water, and the heated cooling water may be cooled by being heat-exchanged with external air by the operation of the cooling fan 311 in the electrical radiator 310. At this time, the first direction switching valve 410 and the second direction switching valve 320 may be adjusted in a direction connecting the heating line 301 and the cooling line 302. In more detail, in the first direction switching valve 410, an upper side and a left side may be connected to each other so that the cooling water flows, and a lower side and a right side may be connected to each other so that the cooling water flows. In addition, in the second direction switching valve 320, a left side and a lower side may be connected to each other so that the cooling water flows, and a connection to a right side may be blocked. In addition, in the third direction switching valve 330, an upper side and a right side may be connected to each other and a left side may be blocked.

As a result, a cycle in which the cooling water is circulated by being passed through the reservoir tank 370, the second direction switching valve 320, the second cooling water pump 420, the first direction switching valve 410, the water-cooled condenser 220, the first cooling water pump 450, the cooling water heater 430, the heater core 440, the first direction switching valve 410, the electrical component 460, and the second cooling water joint 312 in sequence from the electrical radiator 310, and then flowing into the electrical radiator 310 again is repeated. Here, the cooling water may not flow from the second direction switching valve 320 to the first cooling water joint 313 by the second direction switching valve 320, and the cooling water may not flow from the third direction switching valve 330 to the second cooling water joint 312 by the third direction switching valve 330. In addition, a cycle in which the cooling water is circulated by passing through the first cooling water joint 313, the third cooling water pump 340, the battery 350, and the third direction switching valve 330 in sequence from the chiller 252 and flowing into the chiller 252 again is repeated. That is, the battery 350 and the chiller 252 form a cooling line with a separate closed loop through which the cooling water is circulated by the second direction switching valve 320 and the third direction switching valve 330 so that the battery 350 may be separately cooled.

Here, the battery-dedicated cooling mode may be operated when quick charging of the battery is required without cooling the indoor. At this time, the compressor 210 may be rotated at a maximum rotational speed.

4. Maximum Heating Mode

Figure 5:
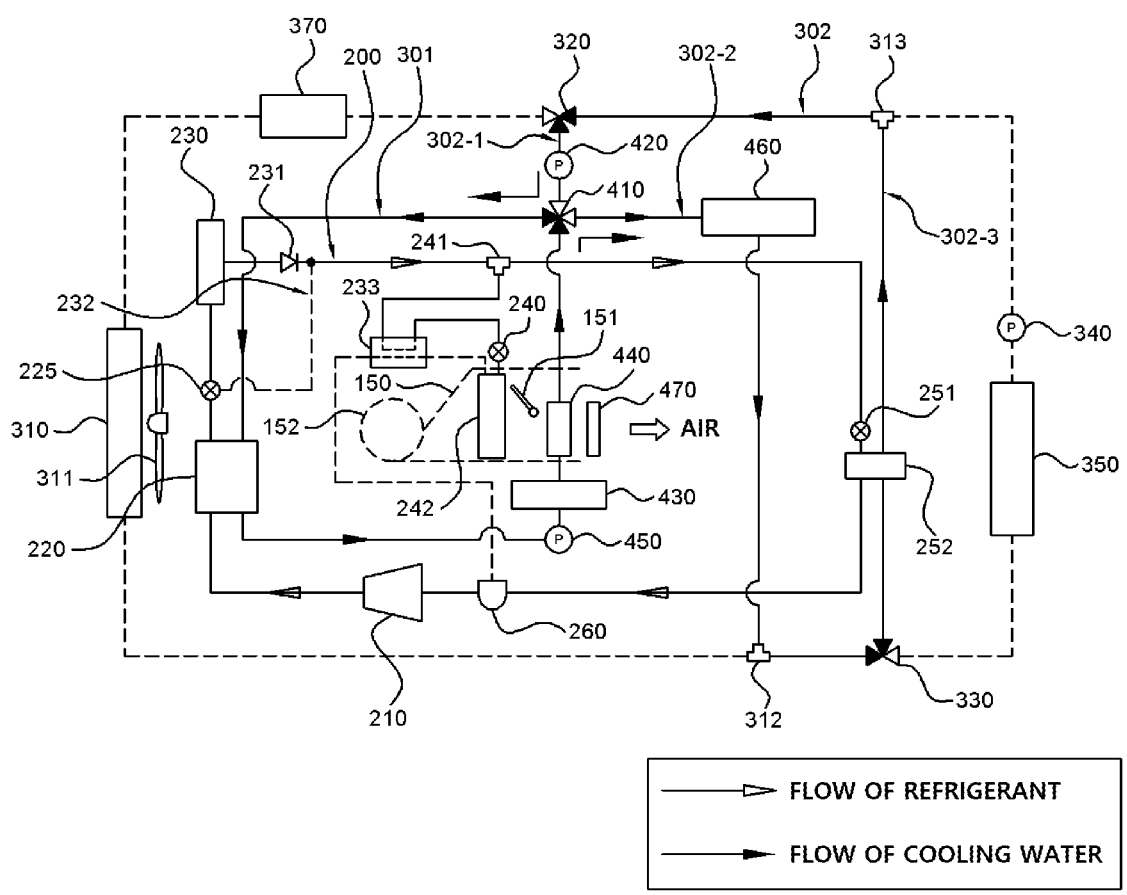
FIG. 5 is a configuration diagram illustrating an operating state in a maximum heating mode of the heat management system according to an embodiment of the present invention.

FIG. 5 is a configuration diagram illustrating an operating state in a maximum heating mode of the heat management system according to an embodiment of the present invention.

Referring to FIG. 5, the compressor 210 operates on the refrigerant circulation line 200, and a high temperature and high pressure refrigerant is discharged from the compressor 210. In addition, the refrigerant discharged from the compressor 210 is cooled by being heat-exchanged with cooling water in the water-cooled condenser 220. Subsequently, the refrigerant cooled in the water-cooled condenser 220 is throttled and expanded while passing through the first expansion valve 225, and the expanded refrigerant passes through the air-cooled condenser 230 and exchanges heat with external air to evaporate the refrigerant to absorb heat from the external air. Subsequently, the refrigerant passes through the refrigerant branch portion 241, passes through the third expansion valve 251 in a fully opened state, and flows into the chiller 252, and in the chiller 252, the refrigerant may be heated by heat exchange between the refrigerant and the cooling water. Then, the refrigerant that has passed through the chiller 252 passes through the accumulator 260 and flows into the compressor 210 again. At this time, the refrigerant may not flow through the first refrigerant bypass line 232 by the first expansion valve 225, and the second expansion valve 240 is blocked so that the refrigerant may not flow to the evaporator 242. Thus, the refrigerant is circulated while repeating the above-described process.

As another example, the first expansion valve 225 may also bypass the refrigerant to the first refrigerant bypass line 232 instead of the air-cooled condenser 230. In a winter heating mode, the air-cooled condenser 230 that is placed outdoors and absorbs heat may cause icing according to a low outdoor temperature. In order to prevent the icing, the refrigerant is bypassed to the first refrigerant bypass line 232, and the refrigerant expands in the second expansion valve 240 when dehumidifying or the third expansion valve 251 when waste heat of the cooling water is recovered in some cases. In addition, in the winter heating mode, when there is a large amount of waste heat recovery from the battery and the electrical component, heat dissipation may occur in the air-cooled condenser 230 as the pressure in the front of the compressor, that is, a low pressure side, increases in the flow direction of the refrigerant. When the heat dissipation occurs in the air-cooled condenser 230, a loss in heating performance occurs, and the refrigerant is bypassed to prevent such a loss.

Meanwhile, the cooling water of the cooling water circulation line 300 is circulated by the operation of the first cooling water pump 450 and the second cooling water pump 420. In addition, the cooling water may be heated while passing through the water-cooled condenser 220, may be heated by the cooling water heater 430, may be heated by waste heat of the electrical component 460, and may be cooled while passing through the chiller 252. At this time, the first direction switching valve 410 and the second direction switching valve 320 may be adjusted in a direction disconnecting the heating line 301 and the cooling line 302. In more detail, in the first direction switching valve 410, an upper side and a right side may be connected to each other so that the cooling water flows, and a lower side and a left side may be connected to each other so that the cooling water flows. In addition, in the second direction switching valve 320, a right side and a lower side may be connected to each other so that the cooling water flows, and a connection to a left side may be blocked. In addition, in the third direction switching valve 330, an upper side and a left side may be connected to each other and a right side may be blocked.

In addition, a cycle in which the cooling water of the heating line 301 is circulated by passing through the first cooling water pump 450, the cooling water heater 430, the heater core 440, the first direction switching valve 410, and the water-cooled condenser 220 in sequence and flowing into the first cooling water pump 450 again is repeated. In addition, a cycle in which the cooling water of the cooling line 302 disconnected from the heating line 301 is circulated by passing through the first direction switching valve 410, the electrical component 460, the second cooling water joint 312, the third direction switching valve 330, the chiller 252, the first cooling water joint 313, and the second direction switching valve 320 in sequence from the second cooling water pump 420 and flowing into the second cooling water pump 420 again is repeated. Here, the cooling water may not flow from the second direction switching valve 320 to the second cooling water joint 312 through the electrical radiator 310 by the second direction switching valve 320, and the cooling water may not flow from the third direction switching valve 330 to the first cooling water joint 313 through the battery 350 and the third cooling water pump 340 by the third direction switching valve 330. In addition, the air is heated by being heat-exchanged with the air blown by the blower 152 of the air conditioner 150 while passing through the heater core 440, the indoor heating is achieved by supplying the heated air to the indoor of the vehicle.

In addition, the heat management system according to the present invention may further include an air heating type heater 470 that is configured separately from the heating line 301 and directly heats air introduced into the indoor to heat the indoor. That is, the air heating type heater 470 may be provided in proximity to the heater core 440, and may be formed of a PTC heater operated by electricity, for example, to rapidly heat air. Thus, it is possible to increase a quick effect of indoor heating. At this time, since the cooling water previously heated by the cooling water heater 430 flows into the heater core 440, the air heating type heater 470 may use a low voltage PTC heater having a relatively small heat generation capacity, and thus may be configured at a lower price than a high voltage PTC heater. Alternatively, although not illustrated, when the air heating type heater 470 is provided in proximity to the heater core 440, the cooling water heater 430 may be installed on the cooling line 302 adjacent to the battery 350 rather than the heating line 301. Thus, the air heating type heater is used for heating and the cooling water heater is separately applied to increase the temperature of the battery, thereby increasing efficiency and allowing separate control of the battery.

Here, the maximum heating mode may be operated when the temperature of the external air is in the range of −20 degrees Celsius to −5 degrees Celsius, and may cool battery 350 by controlling the third direction switching valve 330 and the third cooling water pump 340.

5. Battery Heating Mode

Figure 6:
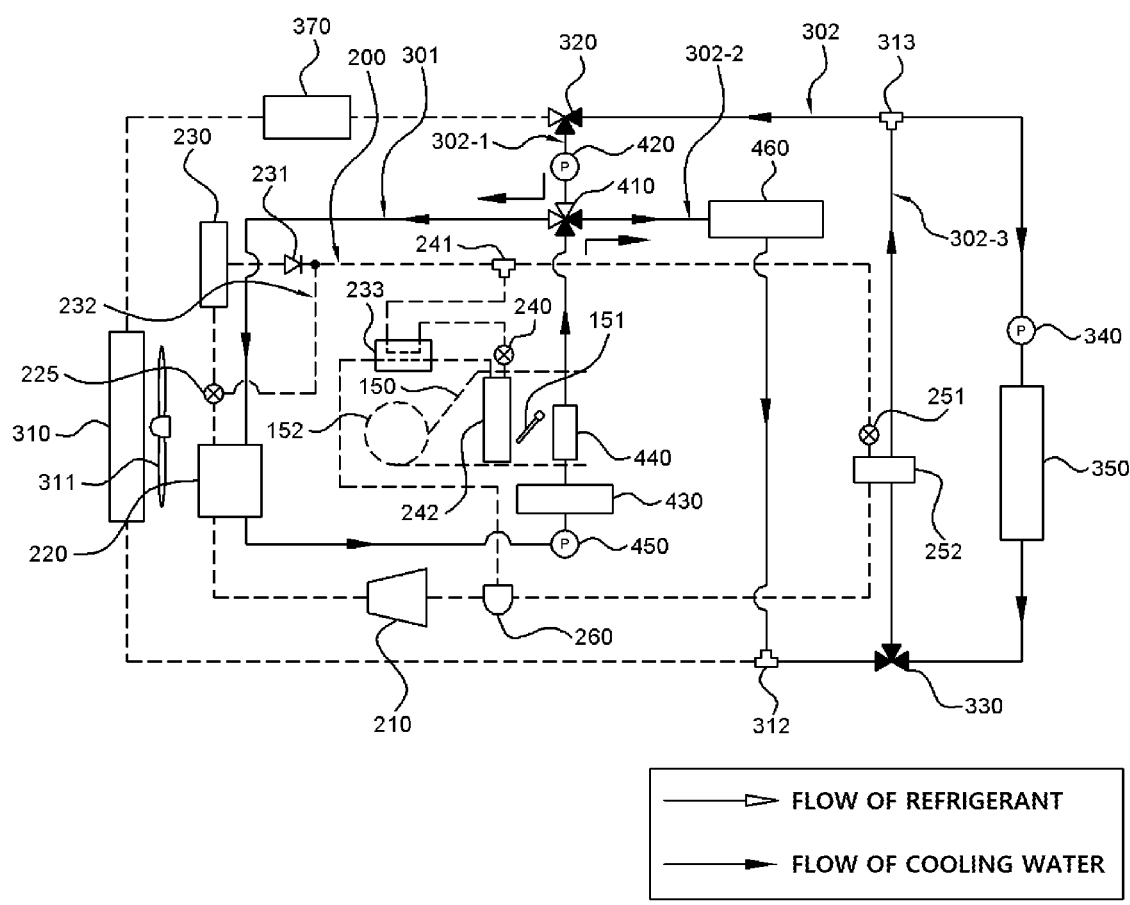
FIG. 6 is a configuration diagram illustrating an operating state in a battery heating mode of the heat management system according to an embodiment of the present invention.

FIG. 6 is a configuration diagram illustrating an operating state in a battery heating mode of the heat management system according to an embodiment of the present invention.

Referring to FIG. 6, the refrigerant circulation line 200 does not operate and the refrigerant is not circulated.

Meanwhile, the cooling water of the cooling water circulation line 300 is circulated by the operation of the first cooling water pump 450, the second cooling water pump 420, and the third cooling water pump 340. In addition, the cooling water may be heated by waste heat of the cooling water heater 430 and the electrical component 460. At this time, the first direction switching valve 410 and the second direction switching valve 320 may be adjusted in a direction connecting the heating line 301 and the cooling line 302. In more detail, in the first direction switching valve 410, an upper side and a left side may be connected to each other so that the cooling water flows, and a lower side and a right side may be connected to each other so that the cooling water flows. In addition, in the second direction switching valve 320, a right side and a lower side may be connected to each other so that the cooling water flows, and a connection to a left side may be blocked. In addition, in the third direction switching valve 330, the left, upper, and right sides are all connected.

As a result, a cycle in which the cooling water is circulated by passing through the first direction switching valve 410, the water-cooled condenser 220, the first cooling water pump 450, the cooling water heater 430, the heater core 440, the first direction switching valve 410, the electrical component 460, the second cooling water joint 312, the third direction switching valve 330, the chiller 252, the first cooling water joint 313, and the second direction switching valve 320 in sequence from the second cooling water pump 420, and then flowing into the second cooling water pump 420 again is repeated. At this time, the cooling water passing through the battery 350 may be joined at the third direction switching valve 330 and flow upward and then branched to both sides at the first cooling water joint 313. Here, the cooling water may not flow from the second direction switching valve 320 to the second cooling water joint 312 through the electrical radiator 310 by the second direction switching valve 320. Thus, the heated cooling water raises the temperature of the battery 350, so that an initial performance of the battery 350 may be quickly improved in the winter when the outside temperature is low.

Here, the battery heating mode may be operated when the temperature of the external air is in the range of −20 degrees Celsius to −5 degrees Celsius.

6. Mild Heating Mode

Figure 7:
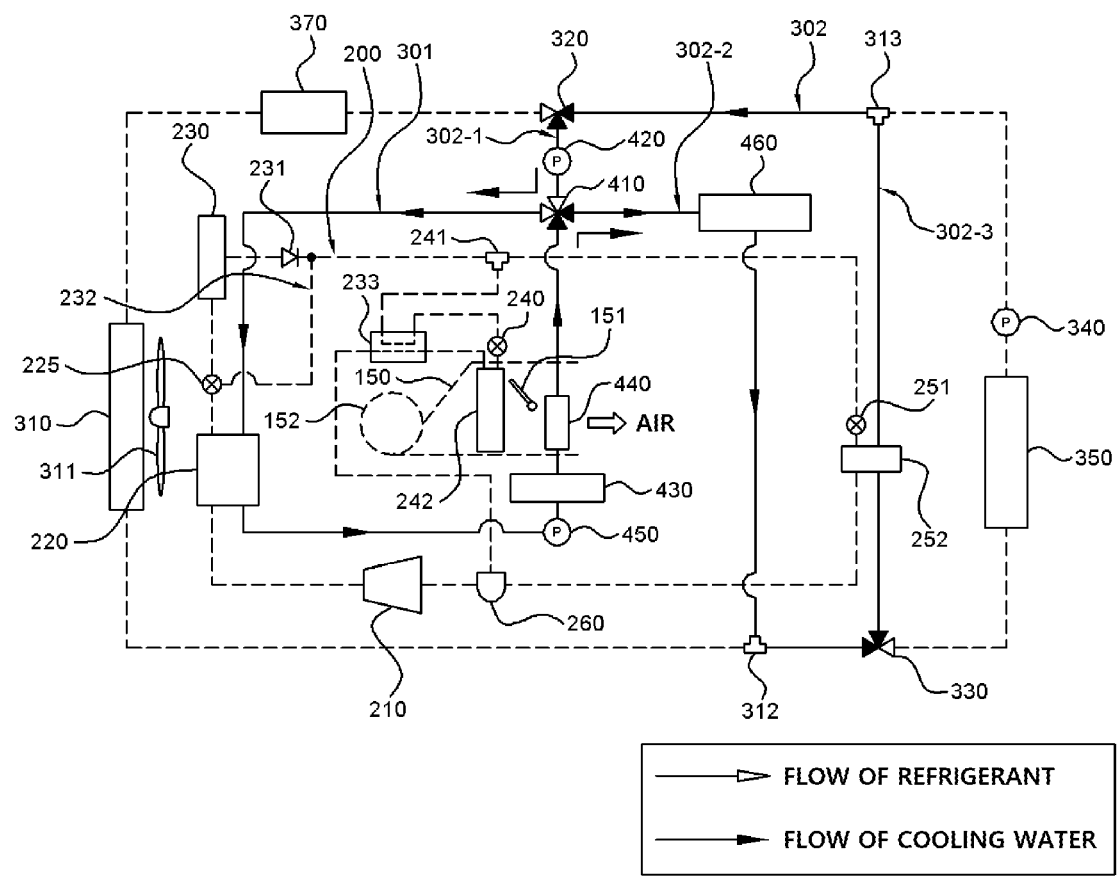
FIG. 7 is a configuration diagram illustrating an operating state in a mild heating mode of the heat management system according to an embodiment of the present invention.

FIG. 7 is a configuration diagram illustrating an operating state in a mild heating mode of the heat management system according to an embodiment of the present invention.

Referring to FIG. 7, the refrigerant circulation line 200 does not operate and the refrigerant is not circulated.

Meanwhile, the cooling water of the cooling water circulation line 300 is circulated by the operation of the first cooling water pump 450 and the second cooling water pump 420. In addition, the cooling water may be heated only by waste heat of the electrical component 460. At this time, the first direction switching valve 410 and the second direction switching valve 320 may be adjusted in a direction connecting the heating line 301 and the cooling line 302. In more detail, in the first direction switching valve 410, an upper side and a left side may be connected to each other so that the cooling water flows, and a lower side and a right side may be connected to each other so that the cooling water flows. In addition, in the second direction switching valve 320, a right side and a lower side may be connected to each other so that the cooling water flows, and a connection to a left side may be blocked. In addition, in the third direction switching valve 330, a left side and an upper side may be connected to each other and a right side may be blocked.

As a result, a cycle in which the cooling water is circulated by passing through the first direction switching valve 410, the water-cooled condenser 220, the first cooling water pump 450, the cooling water heater 430, the heater core 440, the first direction switching valve 410, the electrical component 460, the second cooling water joint 312, the third direction switching valve 330, the chiller 252, the first cooling water joint 313, and the second direction switching valve 320 in sequence from the second cooling water pump 420, and then flowing into the second cooling water pump 420 again is repeated. At this time, the cooling water may not flow from the third direction switching valve 330 to the battery 350, the third cooling water pump 340, and the first cooling water joint 313 by the third direction switching valve 330, and the cooling water may not flow from the second direction switching valve 320 to the second cooling water joint 312 through the electrical radiator 310 by the second direction switching valve 320. Thus, when the demand for heating is low, the cooling water may be heated using only the waste heat of the electrical component 460 and used for indoor heating.

Here, the mild heating mode may be operated when the temperature of the external air is in the range of 5 degrees Celsius to 15 degrees Celsius.

7. Dehumidification Heating Mode

Figure 8:
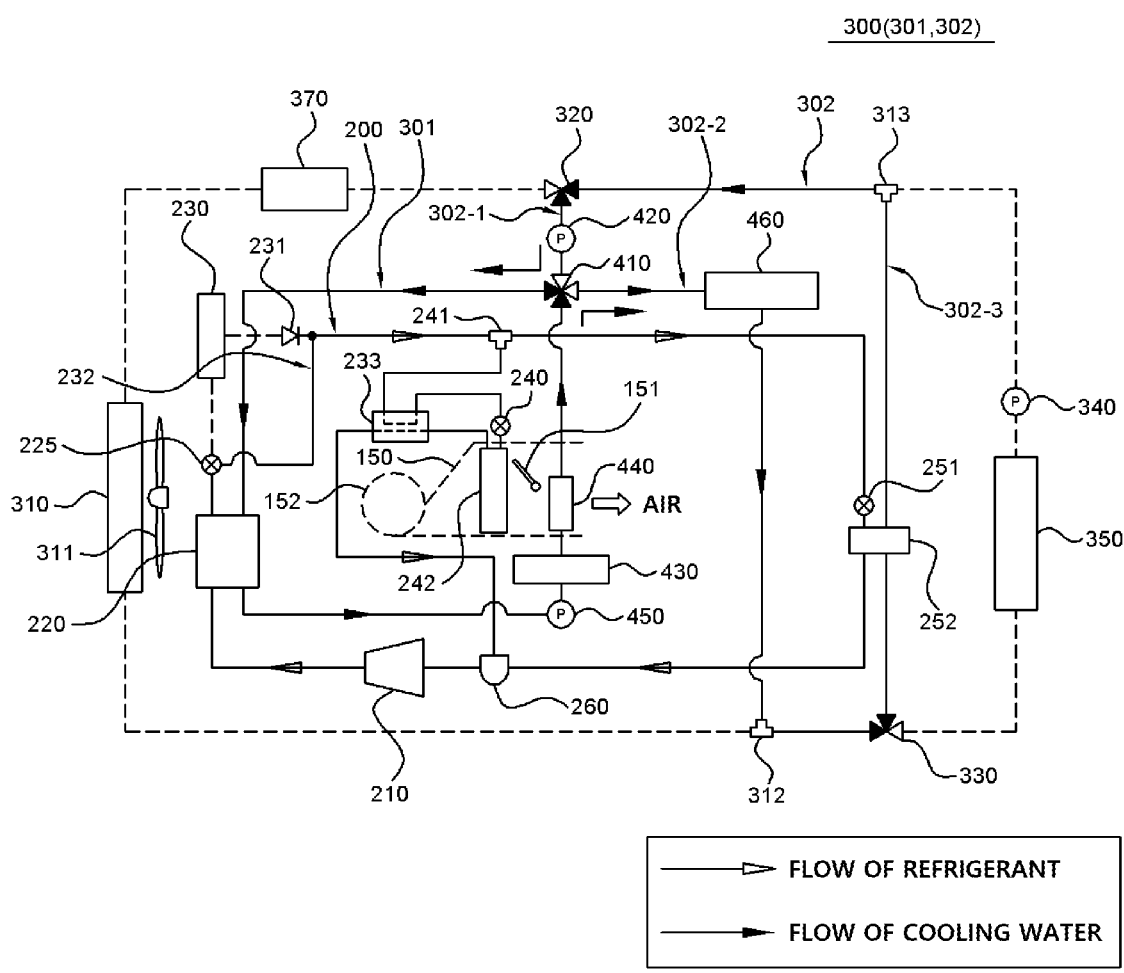
FIG. 8 is a configuration diagram illustrating an operating state in a dehumidification heating mode of the heat management system according to an embodiment of the present invention.

FIG. 8 is a configuration diagram illustrating an operating state in a dehumidification heating mode of the heat management system according to an embodiment of the present invention.

Referring to FIG. 8, the compressor 210 operates on the refrigerant circulation line 200, and a high temperature and high pressure refrigerant is discharged from the compressor 210. In addition, the refrigerant discharged from the compressor 210 is cooled by being heat-exchanged with cooling water in the water-cooled condenser 220. Subsequently, the refrigerant cooled in the water-cooled condenser 220 is throttled while passing through the first expansion valve 225 to expand the refrigerant, the expanded refrigerant passes through the first refrigerant bypass line 232 and is branched at the refrigerant branch portion 241 so that a part of the refrigerant passes through the refrigerant heat exchanger 233 and then bypasses the second expansion valve 240, and thereafter, the refrigerant passes through the evaporator 242 and exchanges heat with the air blown by the blower 152 of the air conditioner 150 to remove moisture in the air. In addition, the refrigerant that has passed through the evaporator 242 passes through the refrigerant heat exchanger 233, passes through the accumulator 260, and flows into the compressor 210 again. In addition, the rest of the refrigerant branched from the refrigerant branch portion 241 bypasses the third expansion valve 251, and thereafter, the refrigerant passes through the chiller 252, is then joined at the accumulator 260, and flows into the compressor 210, and the refrigerant is circulated while repeating the above-described process. At this time, the refrigerant may not flow to the air-cooled condenser 230 by the first expansion valve 225.

As such, in the dehumidification heating, when the air-cooled condenser 230 absorbs heat, heat absorption performance in the evaporator 242 may be insufficient, and when the air-cooled condenser 230 radiates heat, heating performance may be deteriorated. In the present embodiment, the refrigerant bypasses the air-cooled condenser 230 to prevent such problems, thereby sufficiently securing dehumidification heating performance.

Meanwhile, the cooling water of the cooling water circulation line 300 is circulated by the operation of the first cooling water pump 450 and the second cooling water pump 420. In addition, the cooling water may be heated only by waste heat of the electrical component 460. At this time, the first direction switching valve 410 and the second direction switching valve 320 may be adjusted in a direction disconnecting the heating line 301 and the cooling line 302. In more detail, in the first direction switching valve 410, an upper side and a right side may be connected to each other so that the cooling water flows, and a lower side and a left side may be connected to each other so that the cooling water flows. In addition, in the second direction switching valve 320, a right side and a lower side may be connected to each other so that the cooling water flows, and a connection to a left side may be blocked. In addition, in the third direction switching valve 330, a left side and an upper side may be connected to each other and a right side may be blocked.

In addition, a cycle in which the cooling water of the heating line 301 is circulated by passing through the first cooling water pump 450, the cooling water heater 430, the heater core 440, the first direction switching valve 410, and the water-cooled condenser 220 in sequence, and flowing into the first cooling water pump 450 again is repeated. In addition, a cycle in which the cooling water of the cooling line 302 disconnected from the heating line 301 is circulated by passing through the first direction switching valve 410, the electrical component 460, the second cooling water joint 312, the third direction switching valve 330, the chiller 252, the first cooling water joint 313, and the second direction switching valve 320 in sequence from the second cooling water pump 420 and flowing into the second cooling water pump 420 again is repeated. At this time, the cooling water may not flow from the third direction switching valve 330 to the battery 350, the third cooling water pump 340, and the first cooling water joint 313 by the third direction switching valve 330, and the cooling water may not flow from the second direction switching valve 320 to the second cooling water joint 312 through the electrical radiator 310 by the second direction switching valve 320. Here, the cooling water heater 430 may not be operated, and the air dehumidified while passing through the evaporator 242 is heated while passing through the heater core 440 and may be used for indoor heating.

Here, the dehumidification heating mode may be operated when the temperature of the external air is in the range of 5 degrees Celsius to 15 degrees Celsius.

Figure 9:
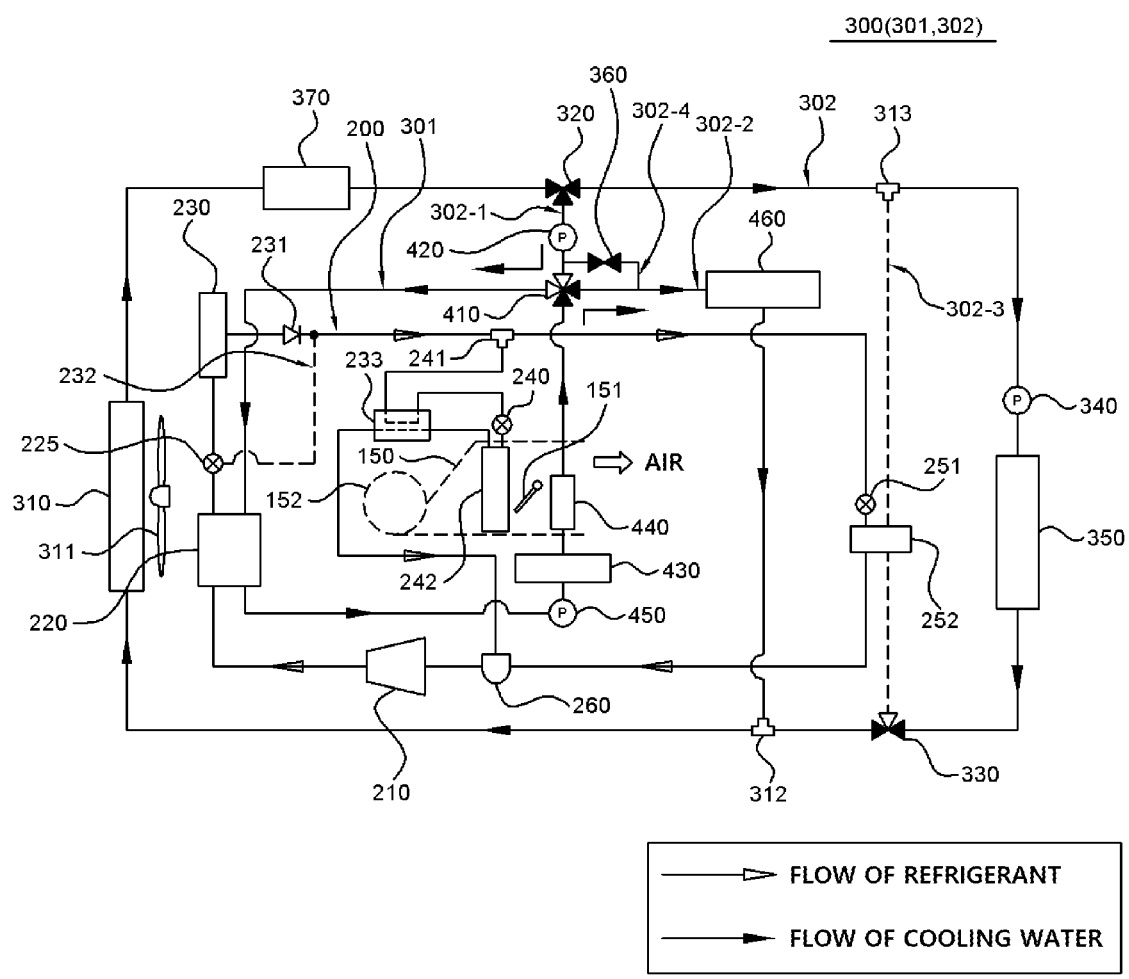
FIG. 9 is a configuration diagram illustrating a heat management system according to another embodiment of the present invention.
Figure 10:
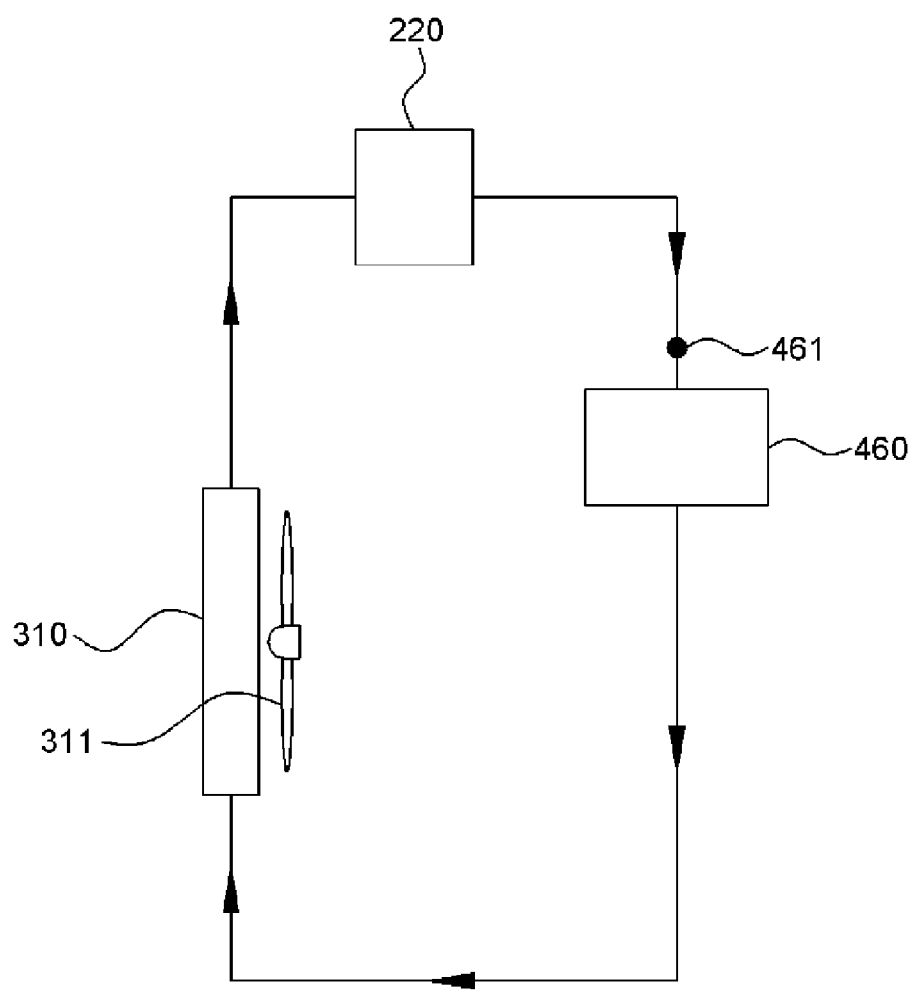
FIGS. 10 and 11 are conceptual diagrams illustrating a flow of cooling water in a cooling water circulation line according to the opening and closing of a shut-off valve in FIG. 9.
Figure 11:
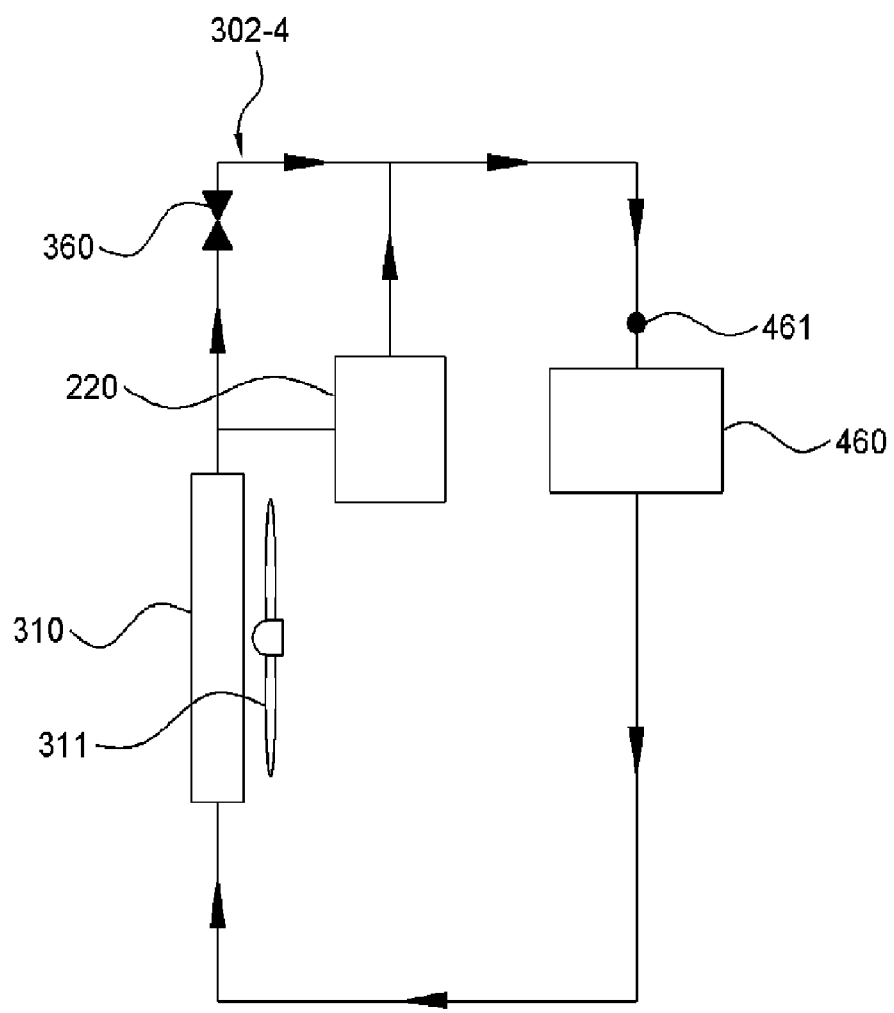

FIG. 9 is a configuration diagram illustrating a heat management system according to another embodiment of the present invention, and FIGS. 10 and 11 are conceptual diagrams illustrating a flow of cooling water in a cooling water circulation line according to the opening and closing of a shut-off valve in FIG. 9.

Referring to FIG. 9, the cooling line 302 may further include a fourth connection line 302-4 connecting the first connection line 302-1 and the second connection line 302-2, and a shut-off valve 360 may be installed on the fourth connection line 302-4 so that the shut-off valve 360 may be disposed in parallel with the first direction switching valve 410.

Thus, in a normal state, as illustrated in FIG. 10, in a state in which the shut-off valve 360 is blocked, the electrical component 460 may be cooled using the flow of cooling water, and when the cooling demand of the electrical component 460 is large, the shut-off valve 360 may be opened as illustrated in FIG. 11 to cool the electrical component 460 using cooler cooling water.

In addition, a cooling water temperature sensor 461 may be installed close to the front of the electrical component 460 in the flow direction of the cooling water, and the cooling of the electrical component 460 may be controlled by controlling the opening and closing of the shut-off valve 360 according to the temperature of the cooling water measured through the cooling water temperature sensor 461.

FIGS. 12 to 15 are configuration diagrams illustrating examples of a refrigerant circulation line according to the present invention.

Figure 12:
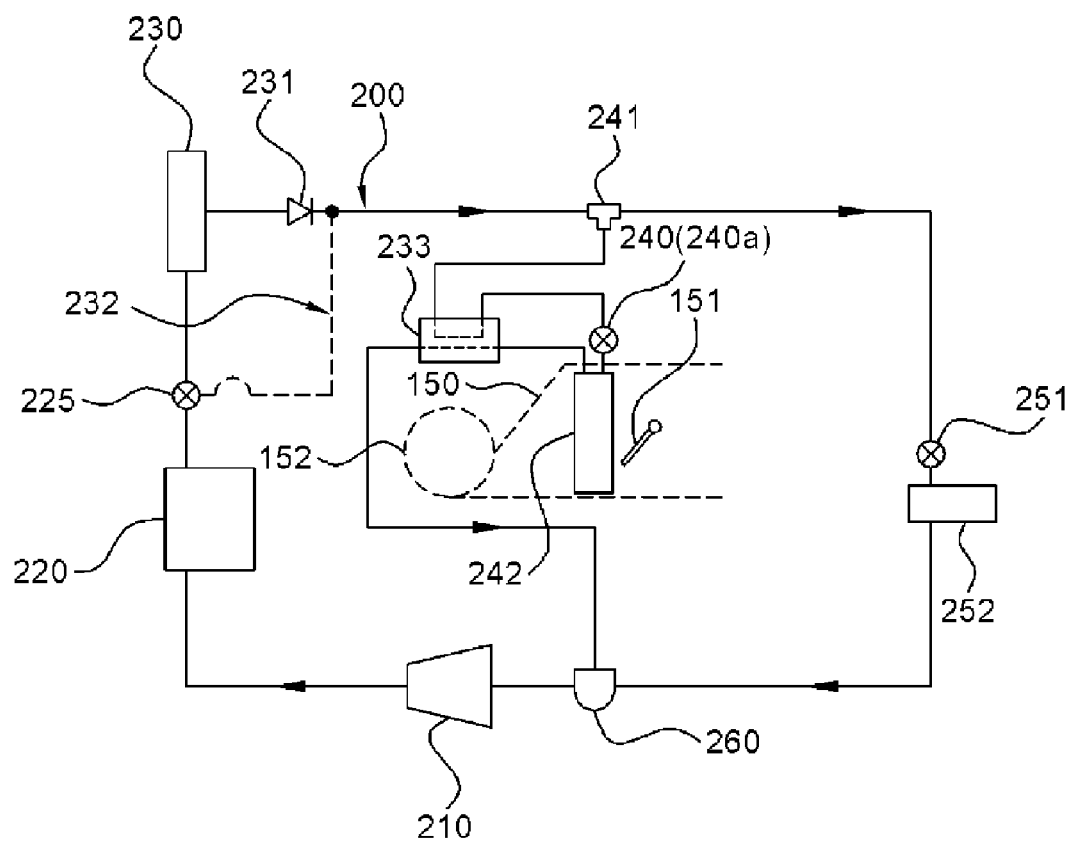
FIGS. 12 to 15 are configuration diagrams illustrating examples of a refrigerant circulation line according to the present invention.

Referring to FIG. 12, the refrigerant circulation line 200 may include the compressor 210, the water-cooled condenser 220, the first expansion valve 225, the air-cooled condenser 230, the check valve 231, the first refrigerant bypass line 232, the refrigerant branch portion 241, the second expansion valve 240, the evaporator 242, the refrigerant heat exchanger 233, the accumulator 260, the third expansion valve 251, and the chiller 252, as described in the embodiment of the present invention. Here, the second expansion valve 240 may be an electronic expansion valve 240a capable of fully opening, completely closing, and electronically controlling a flow rate for throttling the refrigerant. At this time, the electronic expansion valve 240a measures the temperature and pressure of a rear side of the evaporator 242 in the flow direction of the refrigerant with a sensor, and the valve may be controlled using such a value.

Figure 13:
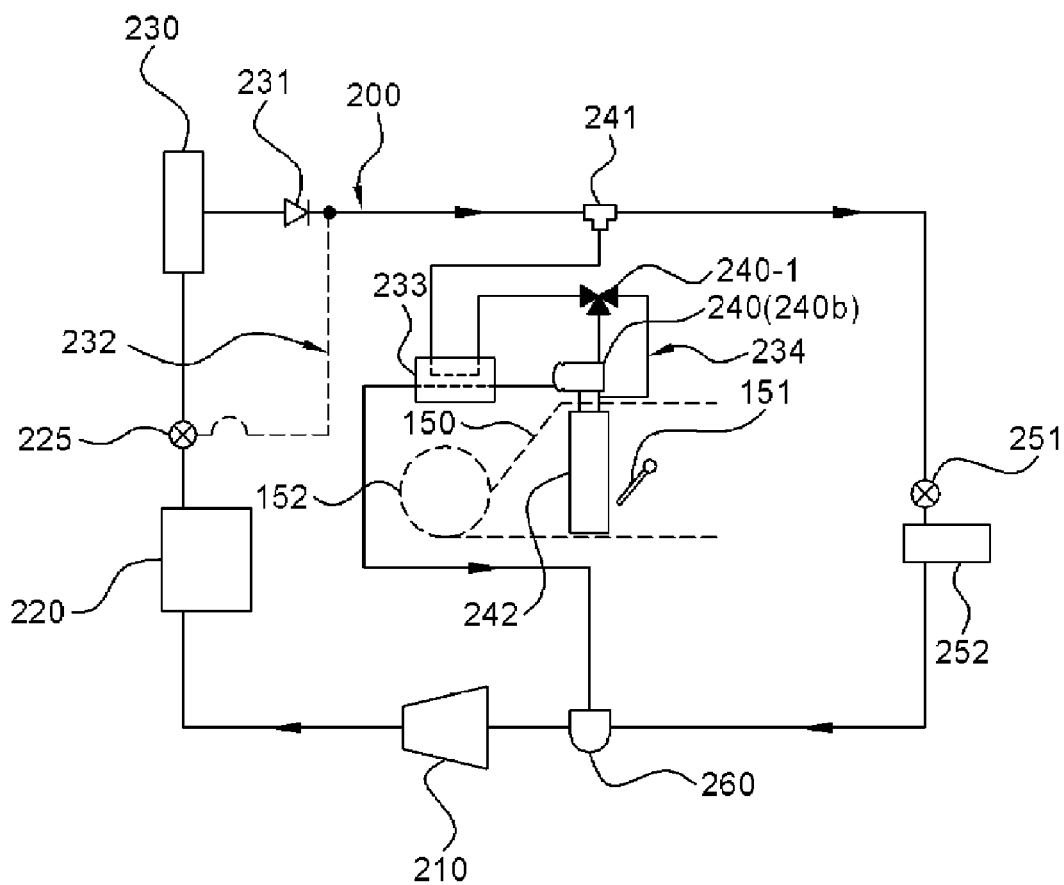

In addition, referring to FIG. 13, the second expansion valve 240 disposed between the refrigerant heat exchanger 233 and the evaporator 242 in the refrigerant circulation line 200 may be a mechanical expansion valve 240b in which a flow rate for throttling the refrigerant is mechanically adjusted according to the temperature of the flowing refrigerant. In addition, the refrigerant circulation line 200 may further include a second refrigerant bypass line 234 connected in parallel with the mechanical expansion valve 240b; and a three-direction switching valve 240-1 installed at a point where the refrigerant is branched to the mechanical expansion valve 240b side and the second refrigerant bypass line 234. Here, the mechanical expansion valve 240b may not be fully opened or completely closed, and may mechanically adjust only the throttled flow rate. Accordingly, the flow of the refrigerant may be adjusted by the three-direction switching valve 240-1, and according to the operation of the three-direction switching valve 240-1, the refrigerant may flow only to the mechanical expansion valve 240b, the refrigerant may flow only to the second refrigerant bypass line 234, or the refrigerant may not flow to both sides.

Figure 14:
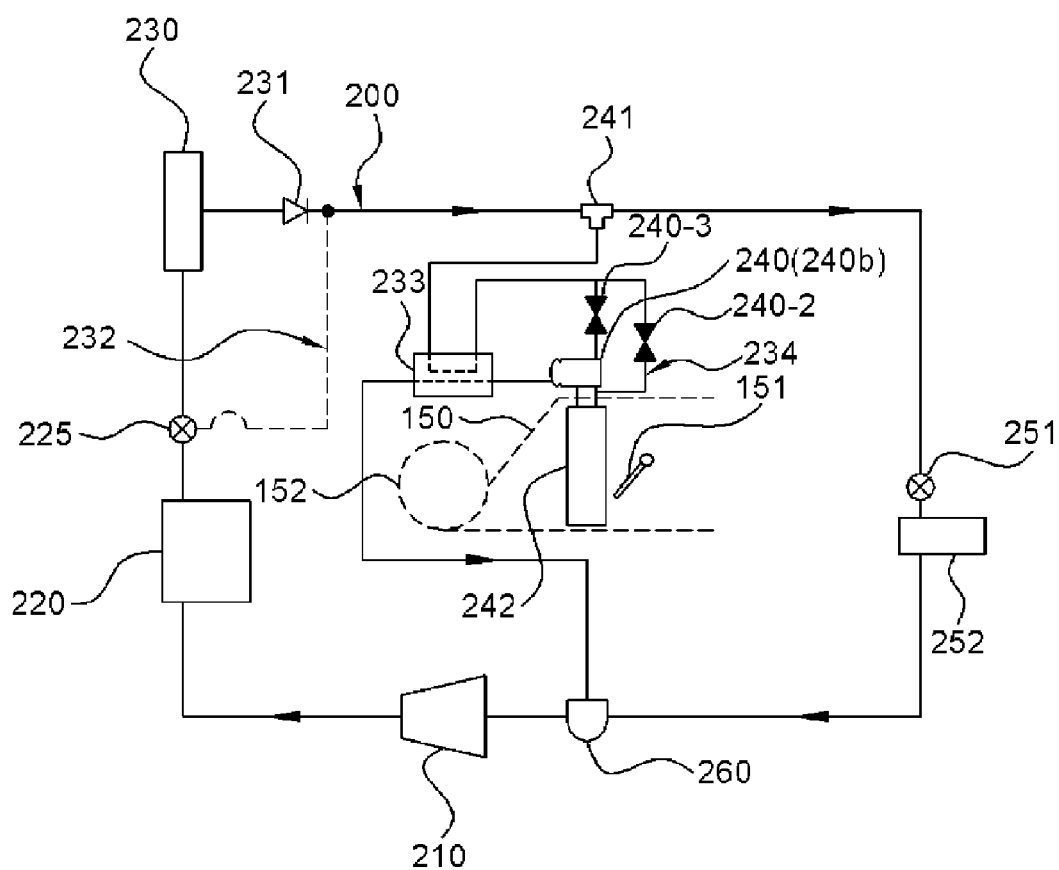

Alternatively, as illustrated in FIG. 14, after the refrigerant comes out of the refrigerant heat exchanger 233 and is branched to the mechanical expansion valve 240b side and the second refrigerant bypass line 234, a second opening/closing valve 240-3 may be installed on the mechanical expansion valve 240b side, and a first opening/closing valve 240-2 may be installed on the second refrigerant bypass line 234. Thus, there is an advantage that a temperature sensor and a pressure sensor are not required at the rear of the evaporator 242 in the flow direction of the refrigerant, and a logic for controlling the second expansion valve 240 is not required.

Figure 15:
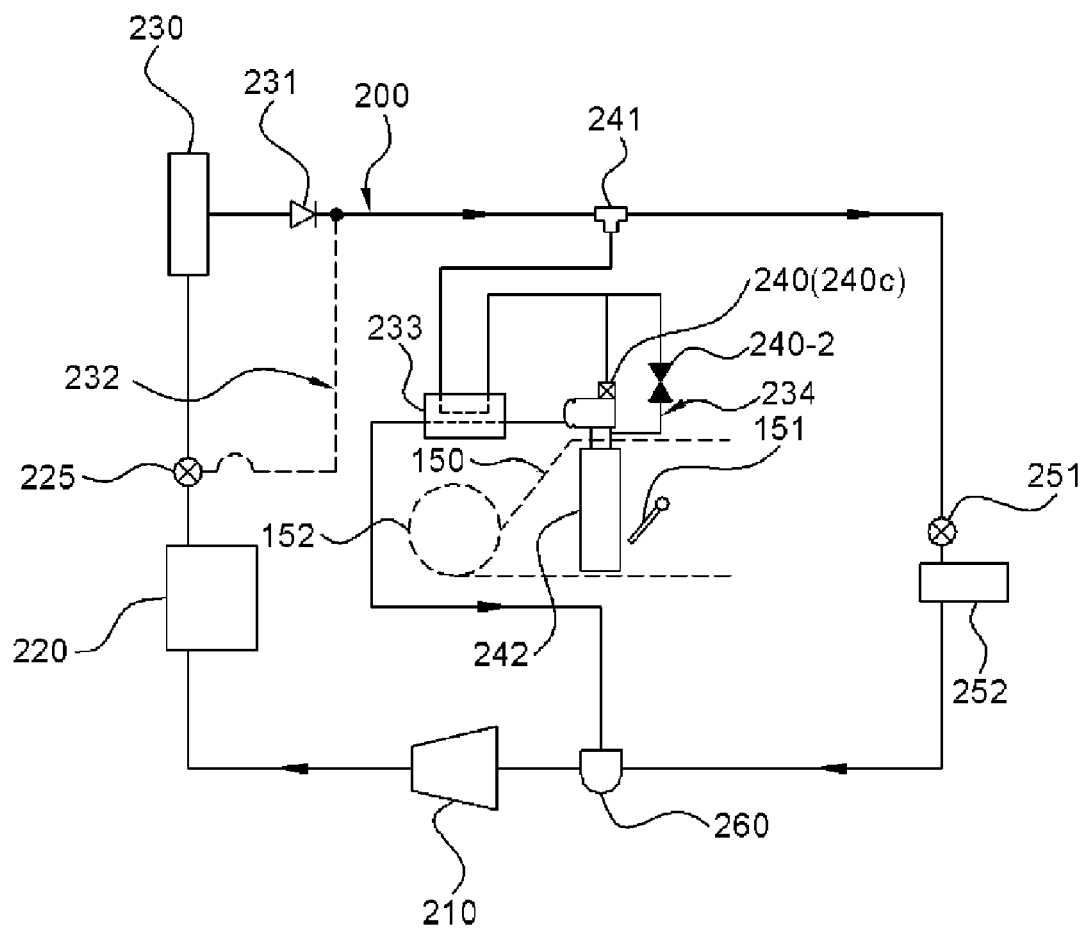

In addition, referring to FIG. 15, the second expansion valve 240 disposed between the refrigerant heat exchanger 233 and the evaporator 242 in the refrigerant circulation line 200 may be a mechanical expansion valve integrated with an electronic opening/closing valve 240c in which a flow rate for throttling the refrigerant is mechanically adjusted according to the temperature of the flowing refrigerant and the electronic opening/closing valve is integrally formed. In addition, the refrigerant circulation line 200 may further include a second refrigerant bypass line 234 connected in parallel with the mechanical expansion valve integrated with an electronic opening/closing valve 240c; and a first opening/closing valve 240-2 installed on the second refrigerant bypass line 234 after the refrigerant is branched. Here, the mechanical expansion valve integrated with an electronic opening/closing valve 240c may mechanically control the throttled flow rate, and may not be fully opened but may be completely closed. Thus, compared to using a mechanical expansion valve and a two-direction switching valve (opening/closing valve), the configuration may be simplified by using the mechanical expansion valve integrated with an electronic opening/closing valve 240c integrally configured.

The present invention is not limited to the above-described embodiments, and may be variously applied. In addition, the present invention may be variously modified by those skilled in the art to which the present invention pertains without departing from the spirit of the present invention claimed in the claims.

DESCRIPTION OF REFERENCE NUMERALS

150: air conditioner, 151: temperature adjustment door, 152: blower
200: refrigerant circulation line, 210: compressor
220: water-cooled condenser, 225: first expansion valve
230: air-cooled condenser, 231: check valve
232: first refrigerant bypass line, 233 refrigerant heat exchanger
234: second refrigerant bypass line, 240: second expansion valve
240a: electronic expansion valve, 240b: mechanical expansion valve
240c: mechanical expansion valve integrated with an electronic opening/closing valve
240-1: three-direction switching valve, 240-2 first opening/closing valve
240-3: second opening/closing valve, 241 refrigerant branch portion
242: evaporator, 251: third expansion valve
252: chiller, 260: accumulator
300: cooling water circulation line, 301: heating line, 302: cooling line
302-1: first connection line, 302-2: second connection line, 302-3: third connection line
310: electrical radiator, 311: cooling fan
312: second cooling water joint, 313: first cooling water joint
320: second direction switching valve, 330: third direction switching valve
340: third cooling water pump, 350: battery
360: shut-off valve, 370: reservoir tank
410: first direction switching valve, 420: second cooling water pump
430: cooling water heater, 440: heater core
450: first cooling water pump, 460: electrical component
461: cooling water temperature sensor, 470: air-heating type heater

The invention claimed is:

1. A heat management system comprising:
a refrigerant circulation line that includes a compressor, a water-cooled condenser, a first expansion valve, an air-cooled condenser, a second expansion valve, an evaporator, a refrigerant heat exchanger for mutually exchanging heat between a refrigerant flowing into the second expansion valve and refrigerant discharged from the evaporator, and a first refrigerant bypass line for allowing the refrigerant passing through the water-cooled condenser to bypass the first expansion valve and the air-cooled condenser, and circulates the refrigerant to cool an indoor space;
a heating line that heats the indoor by circulating cooling water heat-exchanged with the refrigerant through the water-cooled condenser; and
a cooling line that cools a battery and an electrical component by circulating air or the cooling water heat-exchanged with the refrigerant,
wherein the cooling line includes a first connection line branched from one side of the cooling line and connected to the heating line; and a second connection line branched from the other side of the cooling line and connected to the heating line,
wherein the first connection line, the second connection line, and the heating line are connected to a first direction switching valve, and the cooling line and the heating line are connected to each other or are disconnected by the first direction switching valve,
wherein the electrical component is disposed on the second connection line,
wherein the refrigerant circulation line further includes a third expansion valve for throttling, bypassing or blocking a flow of the refrigerant discharged from the water-cooled condenser, and a chiller that exchanges heat between the refrigerant discharged from the third expansion valve and the cooling water of the cooling line, wherein the cooling line includes an electrical radiator for cooling the cooling water with air,
in a maximum cooling mode, the cycle in which the cooling water circulates from the electrical radiator through the water-cooled condenser, heater core, and electrical component back to the electrical radiator, and the cycle in which the cooling water circulates between the battery and chiller form a separate closed loop, so that the battery is cooled separately.

2. The heat management system of claim 1, wherein the first refrigerant bypass line is not used in a cooling mode, and flows the refrigerant in a heating mode.

3. The heat management system of claim 1, wherein the first refrigerant bypass line is not used in a cooling mode, and flows the refrigerant in a dehumidification heating mode.

4. The heat management system of claim 1, wherein the refrigerant heat exchanger exchanges heat between refrigerant flowing into the second expansion valve and refrigerant discharged from the evaporator in a cooling mode, and does not exchange heat between the refrigerant flowing into the second expansion valve and the refrigerant discharged from the evaporator in a heating mode.

5. The heat management system of claim 1, wherein the refrigerant circulation line further includes a check valve installed between a rear side of the air-cooled condenser and a rear end of the first refrigerant bypass line in a flow direction of the refrigerant.

6. The heat management system of claim 1, wherein the refrigerant heat exchanger is connected in parallel with the air-cooled condenser and the chiller.

7. The heat management system of claim 1, wherein the cooling line includes a third connection line connected in parallel with the battery and passing through the chiller, and
the third connection line is connected to the cooling line by a third direction switching valve, such that the cooling water flows or is blocked from flowing to the third connection line by the third direction switching valve.

8. The heat management system of claim 1, wherein the heating line includes a heater core that heats the indoor using heated air by exchanging heat between cooling water heat-exchanged with the refrigerant through the water-cooled condenser and air flowing into the indoor, and a cooling water heater disposed in front of the heater core in the flow direction of the cooling water to heat the cooling water.

9. The heat management system of claim 1, wherein the heating line includes a heater core that heats the indoor using heated air by exchanging heat between cooling water heat-exchanged with the refrigerant through the water-cooled condenser and air flowing into the indoor, and further includes an air heating type heater configured separately from the heating line and directly heats the air flowing into the indoor to heat the indoor.

10. The heat management system of claim 1, wherein the second expansion valve is disposed between the refrigerant heat exchanger and the evaporator,
the second expansion valve is a mechanical expansion valve in which a flow rate for throttling the refrigerant is mechanically adjusted according to a temperature of the flowing refrigerant, and
the refrigerant circulation line further includes a second refrigerant bypass line connected in parallel with the mechanical expansion valve; and a three-direction switching valve installed at a point where the refrigerant is branched to the mechanical expansion valve side and the second refrigerant bypass line.

11. The heat management system of claim 1, wherein the second expansion valve is disposed between the refrigerant heat exchanger and the evaporator,
the second expansion valve is a mechanical expansion valve in which a flow rate for throttling the refrigerant is mechanically adjusted according to a temperature of the flowing refrigerant, and
the refrigerant circulation line further includes a second refrigerant bypass line connected in parallel with the mechanical expansion valve; a first opening/closing valve installed on the second refrigerant bypass line after the refrigerant is branched; and a second opening/closing valve installed on the mechanical expansion valve side after the refrigerant is branched.

12. The heat management system of claim 1, wherein the second expansion valve is disposed between the refrigerant heat exchanger and the evaporator,
the second expansion valve is a mechanical expansion valve integrated with an electronic opening/closing valve in which a flow rate for throttling the refrigerant is mechanically adjusted according to a temperature of the flowing refrigerant, and the electronic opening/closing valve is integrally formed, and
the refrigerant circulation line further includes a second refrigerant bypass line connected in parallel with the mechanical expansion valve integrated with an electronic opening/closing valve; and a first opening/closing valve installed on the second refrigerant bypass line after the refrigerant is branched.

13. The heat management system of claim 1, wherein the cooling line further includes a fourth connection line connecting the first connection line and the second connection line, and a shut-off valve installed on the fourth connection line and disposed in parallel with the first direction switching valve.

14. The heat management system of claim 13, wherein the cooling line further includes a cooling water temperature sensor installed in front of the electrical component in a flow direction of the cooling water.

* * * * *